US010752306B2

(12) United States Patent
Nordstrom

(10) Patent No.: US 10,752,306 B2
(45) Date of Patent: Aug. 25, 2020

(54) FOLDING TRAILER FOR STOWAGE AND METHODS OF USE

(71) Applicant: NorDesign LLC, Monument, CO (US)

(72) Inventor: Mark B. Nordstrom, Monument, CO (US)

(73) Assignee: NorDesign LLC, Monument, CO (US)

( * ) Notice: Subject to any disclaimer, the term of this patent is extended or adjusted under 35 U.S.C. 154(b) by 43 days.

(21) Appl. No.: 16/209,679

(22) Filed: Dec. 4, 2018

(65) Prior Publication Data

US 2019/0111983 A1   Apr. 18, 2019

Related U.S. Application Data

(63) Continuation-in-part of application No. PCT/US2018/025558, filed on Mar. 30, 2018.

(60) Provisional application No. 62/484,172, filed on Apr. 11, 2017.

(51) Int. Cl.
| | |
|---|---|
| *B62D 63/06* | (2006.01) |
| *B62D 63/08* | (2006.01) |
| *B60D 1/54* | (2006.01) |
| *B60P 1/64* | (2006.01) |
| *B62D 53/06* | (2006.01) |

(52) U.S. Cl.
CPC ............. *B62D 63/061* (2013.01); *B60D 1/54* (2013.01); *B60P 1/6409* (2013.01); *B62D 53/062* (2013.01); *B62D 63/08* (2013.01); *B60D 2001/544* (2013.01)

(58) Field of Classification Search
CPC .... B62D 63/06; B62D 63/061; B62D 63/062; B62D 63/08; B60P 1/6409; B60P 3/341; B60D 1/54; B60D 2001/544
See application file for complete search history.

(56) References Cited

U.S. PATENT DOCUMENTS

| | | | | |
|---|---|---|---|---|
| 3,783,960 | A | * | 1/1974 | Feliz .................... B60D 1/246 180/14.2 |
| 4,290,584 | A | | 9/1981 | Eckels et al. |
| 4,711,499 | A | * | 12/1987 | Fortin .................. B62D 63/062 298/17 R |

(Continued)

OTHER PUBLICATIONS

International Search Report for PCT/US2018/025558 from KIPO International Searching Authority, dated Jul. 5, 2018 (3 pages).

(Continued)

*Primary Examiner* — Jacob D Knutson
*Assistant Examiner* — Maurice L Williams
(74) *Attorney, Agent, or Firm* — Terrence M. Wyles, Esq.; Startup IP Law, LLC

(57) ABSTRACT

The inventive disclosures described herein pertain to an improved folding trailer that, in many embodiments, is comprised of an improved swivel jack to more-easily aid in safe trailer-folding operations, a hinged trailer tongue, an integral winch with an extended flexible coupling shaft, and an external or onboard rotational power source to drive the winch. More specifically, this folding-trailer configuration minimizes the physical exertion required of a user to fold or unfold the trailer, as well as significantly reduces the potential for serious user injury during the folding/unfolding process. The improved folding trailer also features foldable cargo-containment sides and multi-positionable tailgate, as well as removable/configurable cargo-carrying racks/rails.

20 Claims, 25 Drawing Sheets

(56) References Cited

U.S. PATENT DOCUMENTS

| | | | | |
|---|---|---|---|---|
| 5,340,145 A * | 8/1994 | Leib | ............... | B60P 3/07 280/491.1 |
| 5,346,240 A * | 9/1994 | Pettit | ............... | B60D 1/54 280/438.1 |
| 5,924,836 A * | 7/1999 | Kelly | ............... | B62D 63/061 280/402 |
| 6,017,081 A | 1/2000 | Colby | | |
| 6,945,343 B1 * | 9/2005 | Moreau | ............... | B60D 1/246 180/11 |
| 7,073,816 B1 * | 7/2006 | Larson | ............... | B62D 63/061 280/656 |
| 7,891,697 B1 * | 2/2011 | Fahrbach | ............... | B62D 63/061 280/656 |
| 8,360,462 B2 | 1/2013 | Mayfield | | |
| 8,590,962 B2 * | 11/2013 | Nye | ............... | B62D 33/027 296/183.1 |
| 8,696,012 B2 * | 4/2014 | Oyasaeter | ............... | B62D 63/061 280/491.1 |
| 9,932,078 B1 * | 4/2018 | Nehring | ............... | B62D 63/061 |
| 9,937,903 B2 * | 4/2018 | Van Den Bos | ............... | B60S 9/08 |
| 9,987,894 B2 * | 6/2018 | Dagenais | ............... | B60D 1/52 |
| 2006/0033351 A1 | 2/2006 | Taylor | | |
| 2007/0018429 A1 * | 1/2007 | Randall | ............... | B60D 1/155 280/491.1 |
| 2007/0080508 A1 | 4/2007 | Owens et al. | | |
| 2007/0296246 A1 * | 12/2007 | Roseborough | ............... | B60P 3/341 296/159 |
| 2009/0212515 A1 * | 8/2009 | Oyasaeter | ............... | B62D 63/062 280/40 |
| 2010/0084839 A1 | 4/2010 | Mayfield | | |
| 2011/0121544 A1 * | 5/2011 | Pearce | ............... | B62D 63/061 280/641 |
| 2011/0221168 A1 * | 9/2011 | Alexander | ............... | B62D 63/061 280/639 |
| 2012/0261909 A1 * | 10/2012 | Belanger | ............... | B60P 1/14 280/656 |
| 2013/0015636 A1 * | 1/2013 | Shepard | ............... | B62D 63/061 280/415.1 |
| 2014/0312593 A1 * | 10/2014 | Bank | ............... | B62D 63/061 280/400 |
| 2015/0158333 A1 * | 6/2015 | Turba | ............... | B60P 1/00 700/90 |
| 2018/0001941 A1 * | 1/2018 | Polidori | ............... | B62D 35/001 |
| 2018/0178605 A1 * | 6/2018 | Comeaux | ............... | B60D 1/06 |
| 2018/0201336 A1 * | 7/2018 | Mckeever | ............... | B62D 63/061 |

OTHER PUBLICATIONS

Written Opinion from International Searching Authority for PCT/US2018/025558 from KIPO International Preliminary Examination Authority, dated Jul. 5, 2018 (14 pages).

* cited by examiner

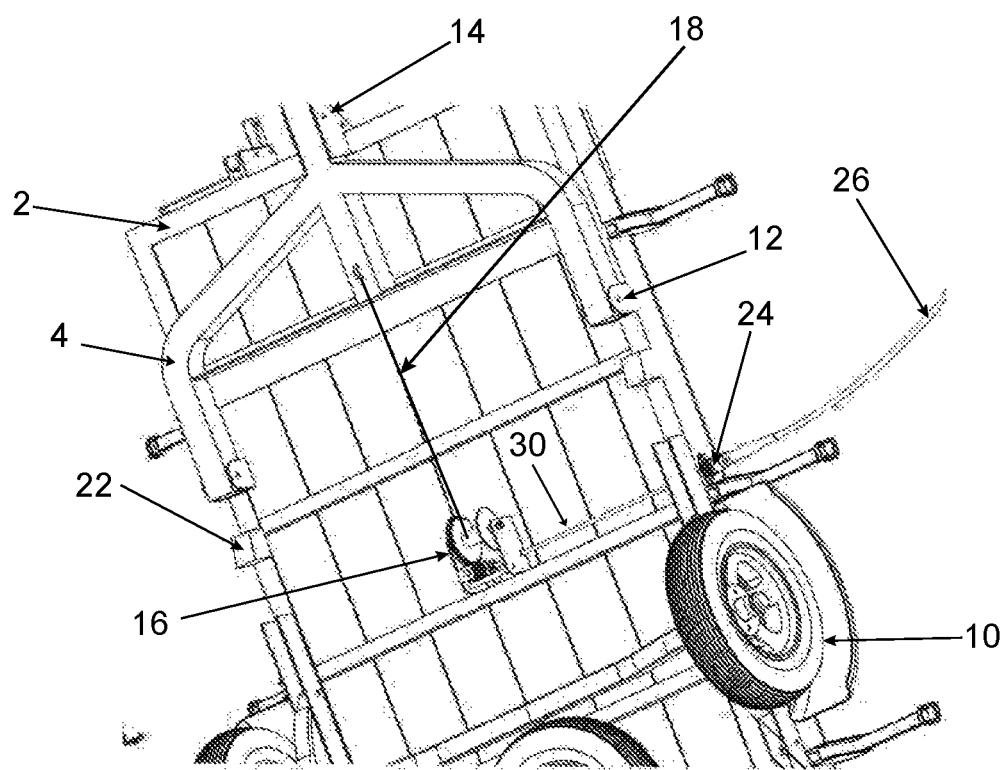
FIG. 1C-A

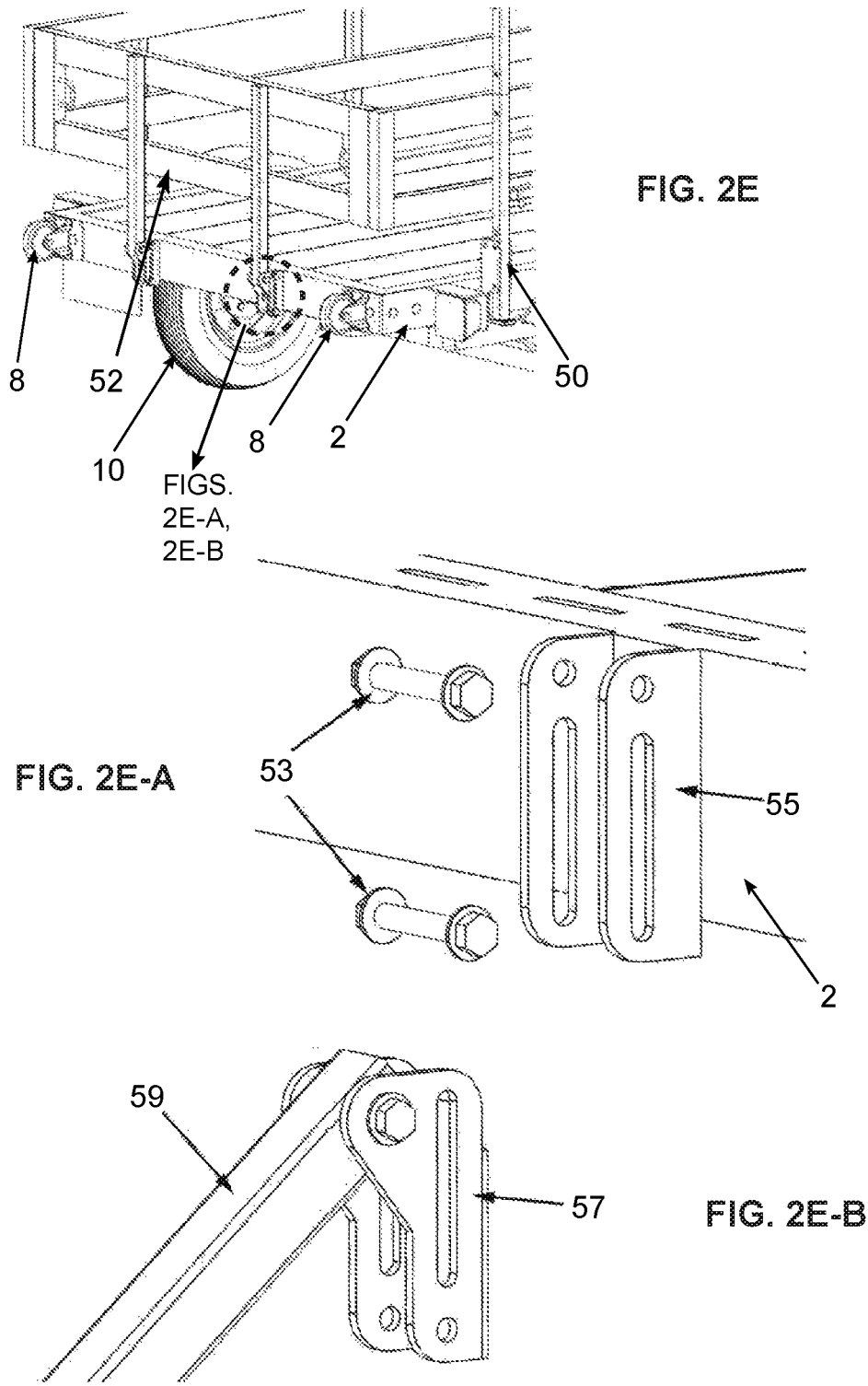

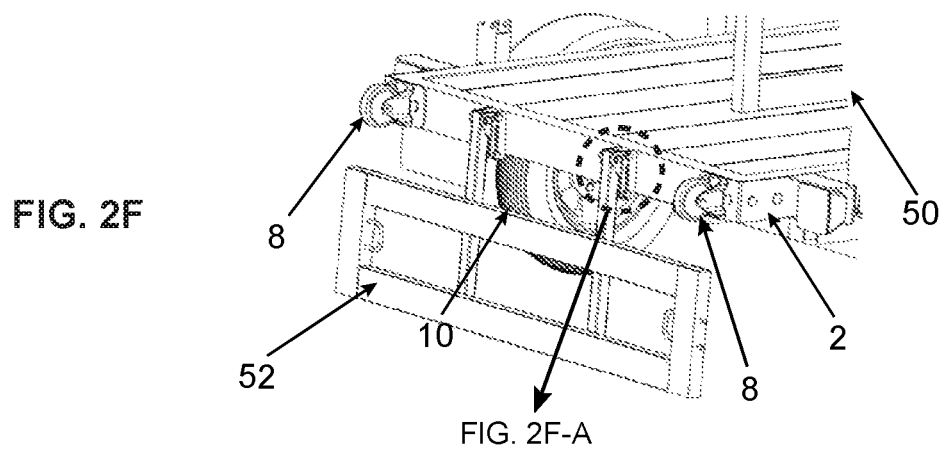
FIG. 2F
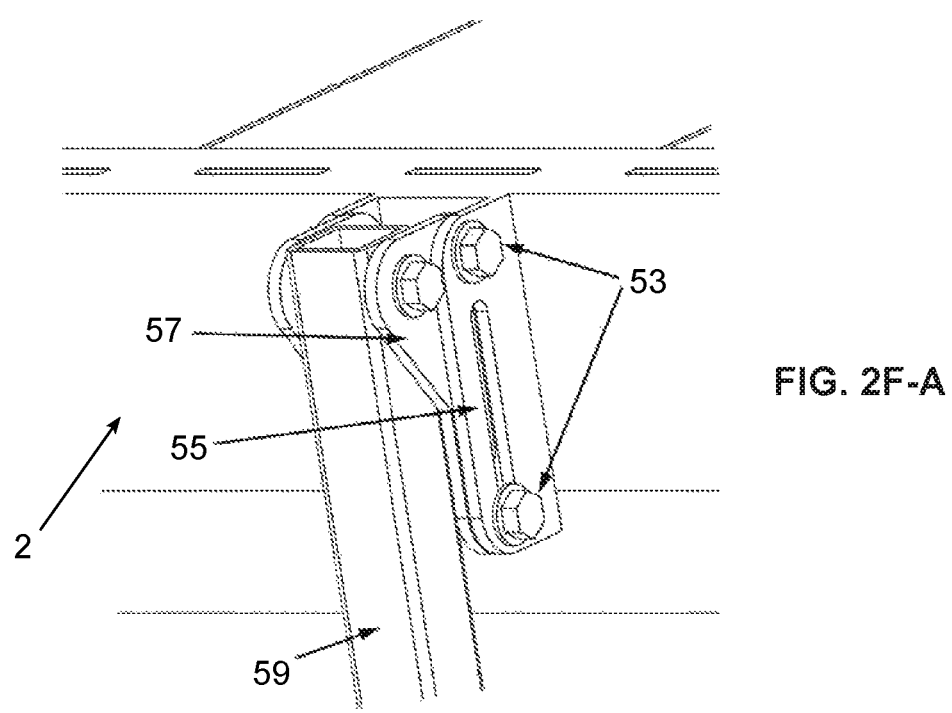
FIG. 2F-A

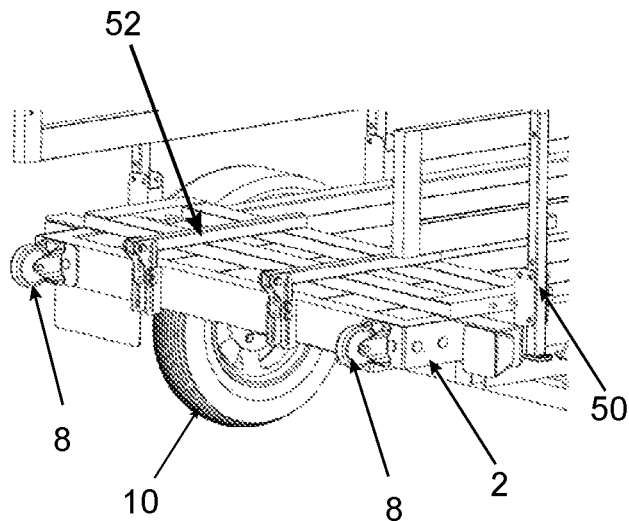
FIG. 2G
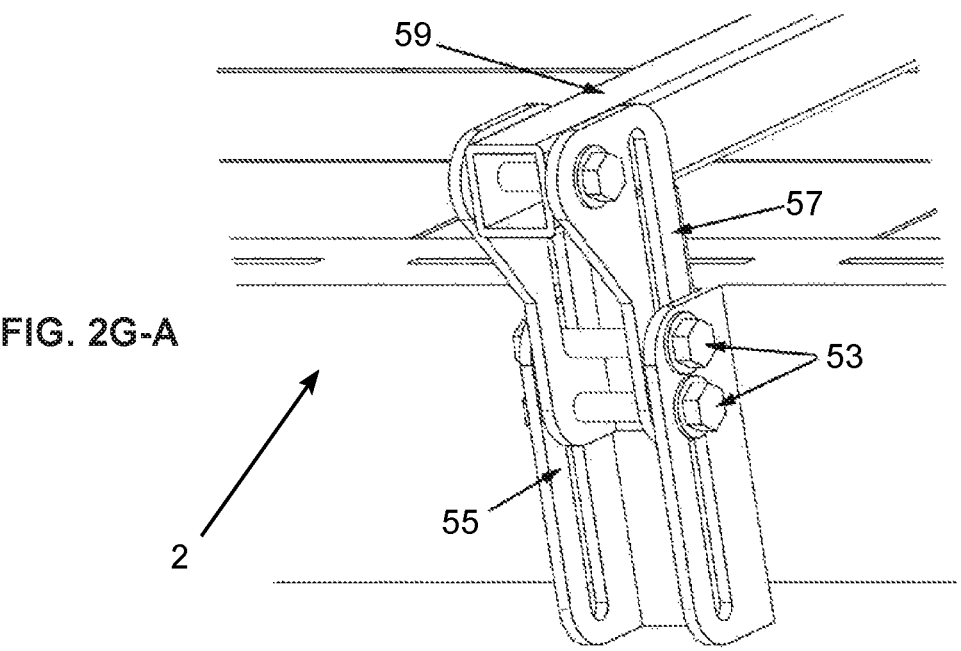
FIG. 2G-A

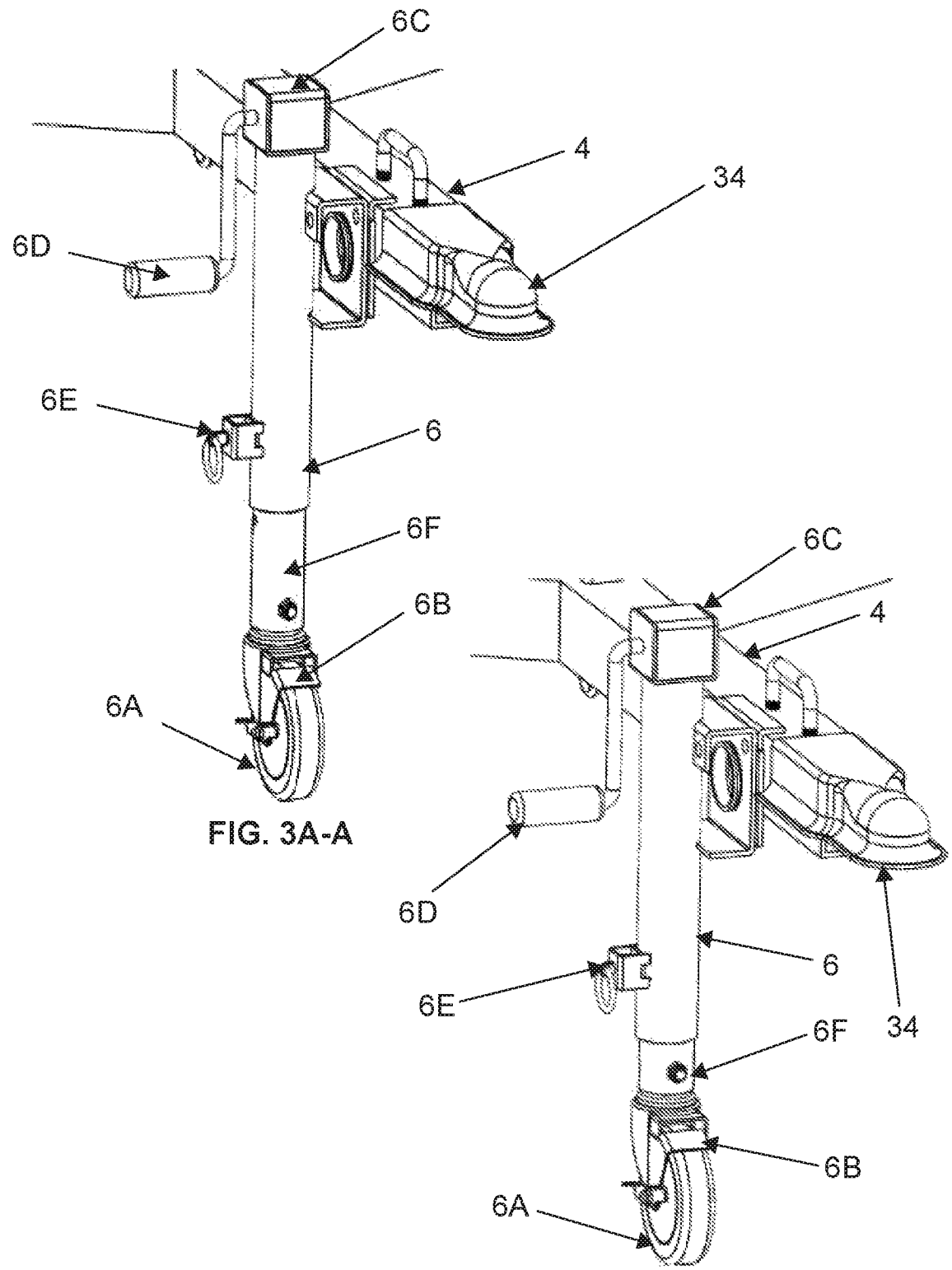
FIG. 3A-A
FIG. 3A-B

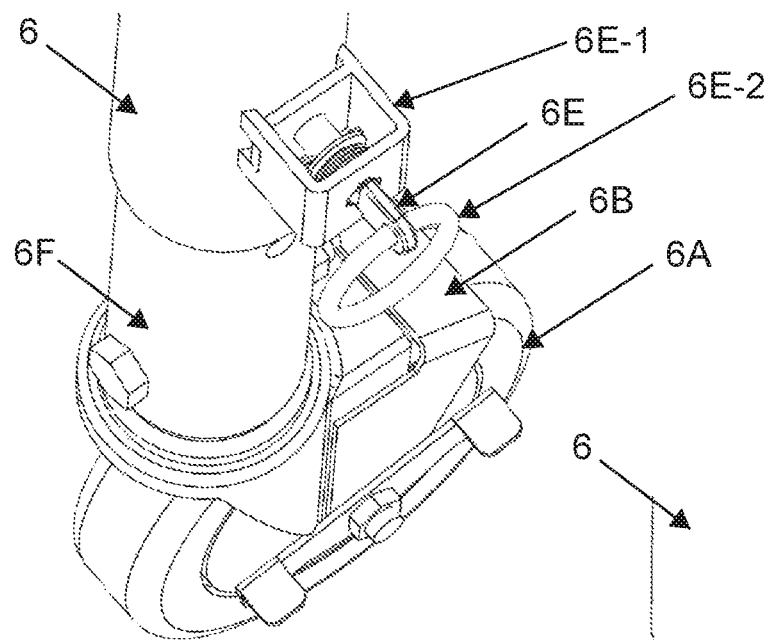
FIG. 3C-A
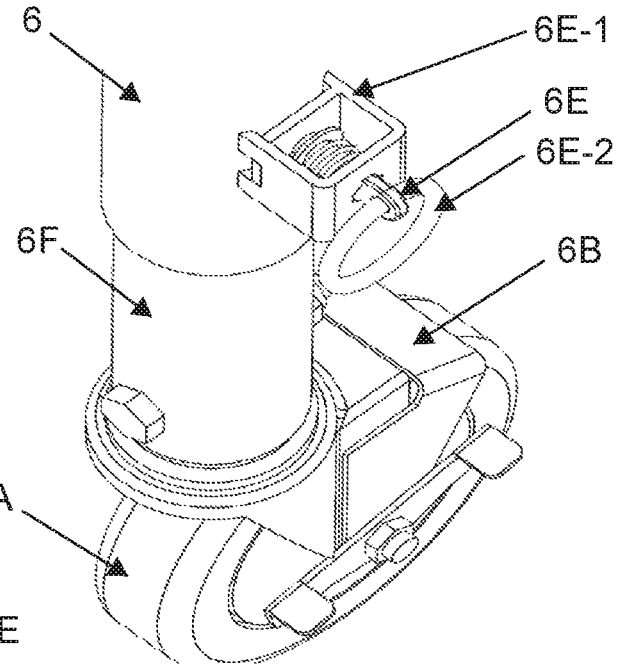
FIG. 3C-B
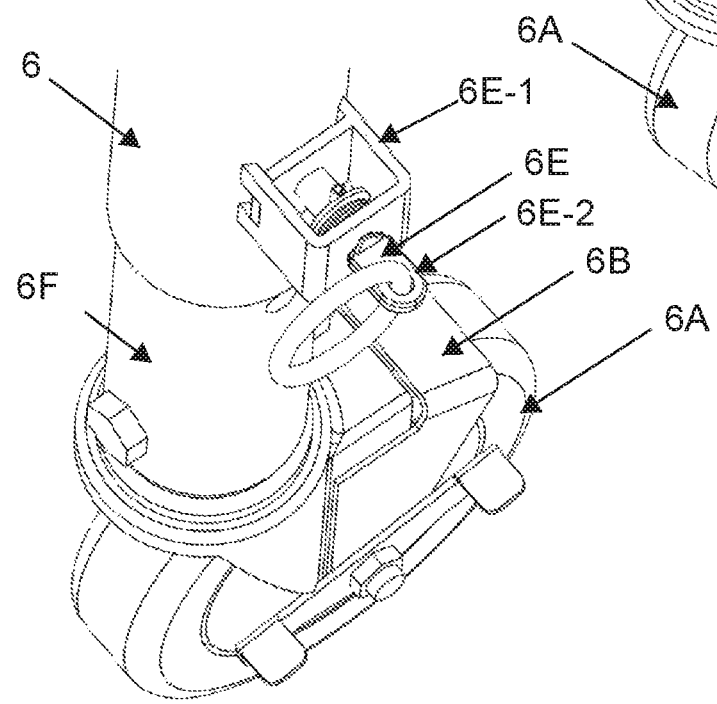
FIG. 3C-C

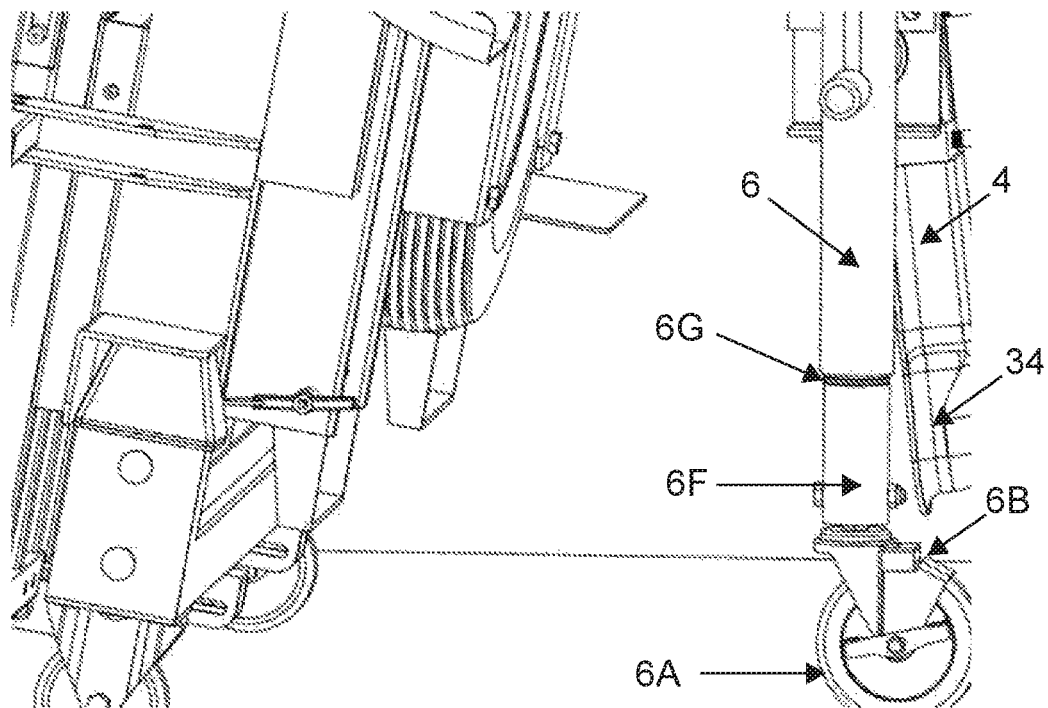
FIG. 3D-A
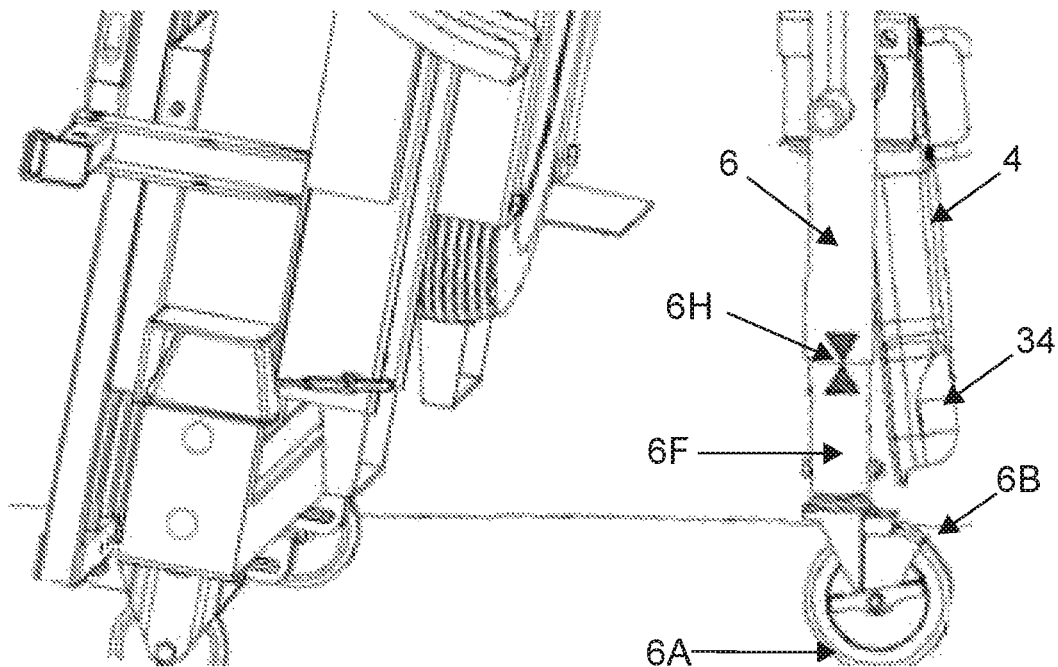
FIG. 3D-B

FOLDING TRAILER FOR STOWAGE AND METHODS OF USE

CROSS-REFERENCE TO RELATED APPLICATIONS

The present patent application is a Continuation-in-Part of, and claims the priority benefit of, Patent Cooperation Treaty (PCT) Application No. PCT/US2018/025558, filed on Mar. 30, 2018 for "Improved Folding Trailer and Methods of Use," which in turn claims the priority benefit of U.S. Patent Application No. 62/484,172, filed on Apr. 11, 2017 for "Improved Folding Trailer and Methods of Use." In addition, the present patent application hereby incorporates by reference both PCT Application No. PCT/US2018/025558 and U.S. Patent Application No. 62/484,172 in their entirety for all purposes. For purposes of claim construction, if there are any unresolvable inconsistencies between the teaching of the present patent application and either PCT Application No. PCT/US2018/025558 and/or U.S. Patent Application No. 62/484,172, then the teachings of the present patent application shall govern.

BACKGROUND

A problem faced by many trailer owners is the amount of space required to store a trailer. As an example, storing a conventional trailer in an average-sized garage bay can occupy the space meant for a passenger vehicle. This issue also presents itself for businesses that rent/lease utility/cargo trailers (e.g., U-Haul® franchises) and that may have limited available on-site real estate for parking/stowing a plurality of trailers not being used. To solve these types of problems, folding trailers were developed. Though there are many configurations of folding trailers in the art, all of the existing configurations share three negative aspects: First, they require substantial physical exertion to fold and unfold; second, handling the trailer components when folding or unfolding can present the potential for serious injury to users; and third, the process of folding and unfolding a trailer is very time-consuming. What is needed is an improved folding trailer that addresses these issues in a cost-effective, easy-to-use fashion.

BRIEF SUMMARY

The inventive disclosures described herein pertain to an improved folding trailer for stowage that, in many cases, is comprised of a hinged trailer tongue, an integral winch, and a means to power the winch. More specifically, this folding-trailer configuration significantly minimizes the physical exertion required of a user to fold or unfold the trailer, significantly reduces the potential for serious user injury during the folding/unfolding process, and greatly reduces the time required to fold and unfold the trailer.

The integral winch folds the improved folding trailer and the trailer tongue in a jackknife fashion for storage by means of an external power source that can be easily coupled and decoupled from the mechanical winch device. In many variations, the external power source attaches to winch drive shaft on the outside of the trailer bed, at a safe distance from the trailer. The integral winch requires minimal torque to operate, and in some applications, a means to manually operate the mechanical winch is provided. In typical embodiments, however, a small external power source, including but not limited to, a cordless drill, can easily supply the mechanical power required to fold/unfold the trailer.

In some versions of the improved folding trailer, the power source for operating the winch is by way of an integrated electric motor, which is coupled to the winch gearing. In variations, the winch motor is powered by an onboard rechargeable battery and/or an external electric-cable connection to the trailer and can be controlled with a handheld wireless remote-control device to allow a user to stand a safe distance from the trailer as it is being folded or unfolded. In some cases, the power to the cable can be supplied via a nearby automobile. In some variations, the electric power supplied by a nearby automobile is by way of one of many standard trailer-cable connection configurations known in the art, while in other variations, the electric power can come from a power outlet internal to the nearby automobile or from another standard 120-VAC outlet using a typical AC-DC converter known in the art.

Finally, the improved folding trailer also features collapsible sides and tailgate on the flatbed portion (/cargo area) of the trailer, with multiple extended configurations possible to provide robust cargo-storage/hauling capabilities.

The foregoing Brief Summary is intended to merely provide a short, general overview of the inventive disclosures described throughout this patent application, and therefore, is not intended to limit the scope of the inventive disclosure contained throughout the balance of this patent application, including the appended claims and drawings.

BRIEF DESCRIPTION OF THE DRAWINGS

FIG. 1C-A depicts one embodiment of an isometric bottom-left view of an improved folding trailer, in an unfolded configuration, and featuring the winch drive shaft, the drive-shaft coupler, and a flexible external drive-shaft extension.

FIGS. 2E, 2E-A, and 2E-B depict one embodiment of a close-up view of the rear tailgate of an improved folding trailer, with the tailgate in an upright, closed (cargo-containing) position, with FIGS. 2E-A and 2E-B showing close-up, exploded views of the key tailgate-linkage-assembly components that facilitate multiple position modes, including two nut-bolt assemblies, a sliding hinge base, and an anchor flange. The slots in both the sliding hinge base and the anchor flange allow each of the nut/bolt assemblies to slide in a fashion to raise and lower the tailgate in conjunction with the pivoting hinge.

FIGS. 2F and 2F-A depict one embodiment of a close-up view of the rear tailgate of an improved folding trailer, with the tailgate in a folded-down position whereby the tailgate hangs below the flatbed portion of the trailer, with FIG. 2F-A showing a close-up view of one of the tailgate-linkage assembly in the folded-down mode.

FIGS. 2G and 2G-A depict one embodiment of a close-up view of the rear tailgate of an improved folding trailer, whereby the e tailgate lies flat against the plane of the flatbed portion of the trailer folded-down position, with FIG. 2G-A showing a close-up view of one of the tailgate-linkage assembly in that mode.

FIGS. 3A-A and 3A-B each depict one embodiment of a close-up view of the an improved swivel-wheel trailer jack on an improved folding trailer, with FIG. 3A-A showing the inner jack tube extended and the locking pin disengaged and FIG. 3A-B showing the inner jack tube retracted and the locking pin engaged.

FIG. 3B depicts one embodiment of cut-away view of an improved trailer swivel jack's locking-pin assembly used to fix the positions of the inner and outer jack tubes relative to each other at a predetermined point.

FIGS. 3C-A, 3C-B, and 3C-C, each depict an isometric external view of one embodiment of an improved trailer swivel jack's locking-pin assembly used to fix the positions of the inner and outer jack tubes relative to each other at a predetermined point. In FIG. 3C-A, the locking pin is shown disengaged with the spring compressed as the pin is butted against the outer jack-tube wall and is not aligned to be inserted in the pre-fabricated hole in the inner jack tube. In FIG. 3C-B, the locking pin is shown fully engaged with the prefabricated hole in the inner jack tube, with the locking-pin spring uncompressed. In FIG. 3C-C, the locking pin is shown disengaged with the spring compressed and with the pin rotated about 90 degrees so that the locking pin will remain disengaged even if the pin is aligned with the holes in the inner and outer jack tubes.

FIGS. 3D-A and 3D-B, each shows a different embodiment of an improved swivel jack on an improved folding trailer wherein the swivel jack is in its front-extended position to facilitate trailer folding, wherein there is visual indictor on the improved swivel jack's inner and outer tubes to aid a user in determining is the jack is extended to the ideal position for trailer-folding operations. In the case of FIG. 3D-A, the visual indicator is in the form of a line and/or scoring on the inner swivel-jack tube that is to be positioned, ideally, just below the lower edge of the outer swivel-jack tube. In the case of FIG. 3D-B, the visual indicator is in the form of two mating arrows (or similar graphical indictors), one on the outer swivel-jack tube and the other on the inner swivel-jack tube.

Figure 4A:
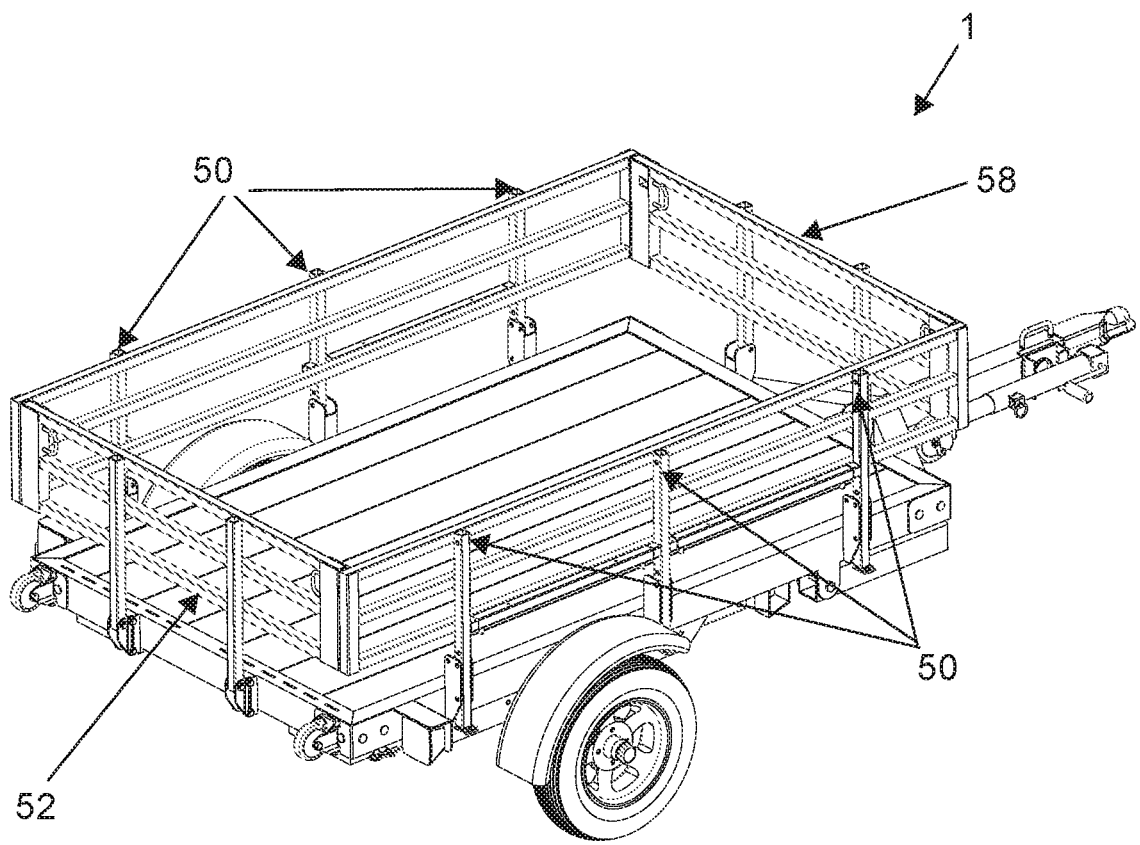
FIG. 4A depicts one embodiment of an isometric view of an improved folding trailer, with its cargo-containing sides/gates disposed upward to create a cargo-containment area.
Figure 4B:
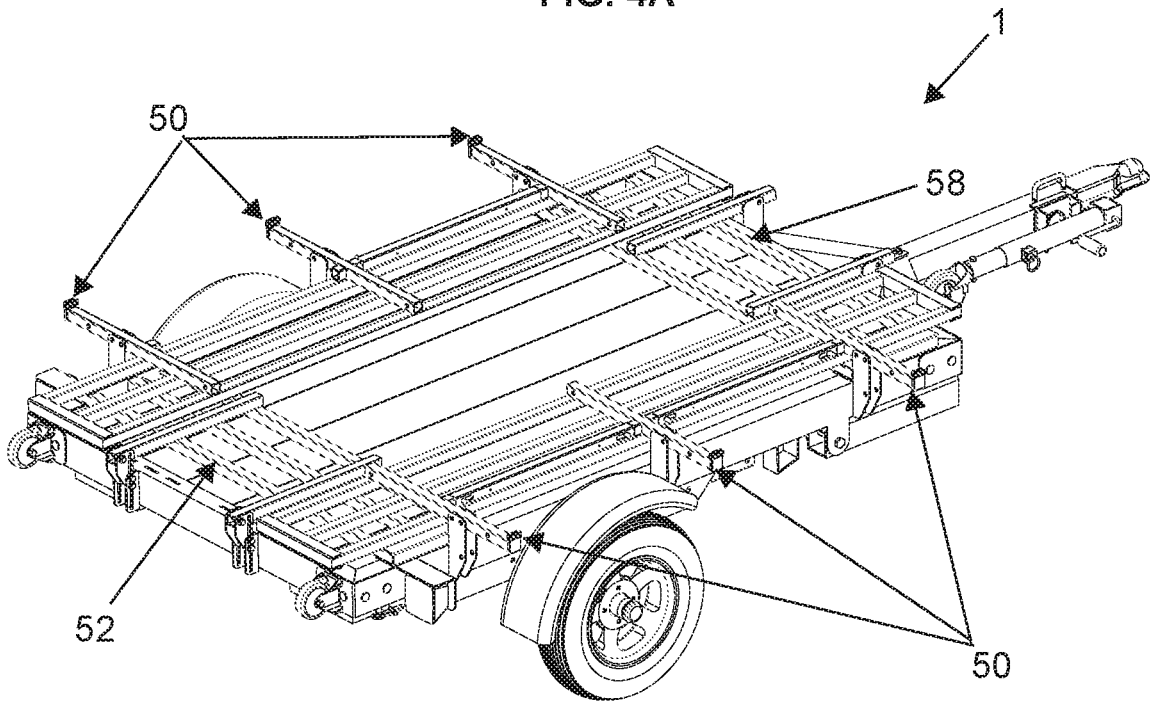
FIG. 4B depicts one embodiment of an isometric view of an improved folding trailer, with its cargo-containing sides/ gates disposed in a flat-folded configuration against the bed of the improved folding trailer.
Figure 4C:
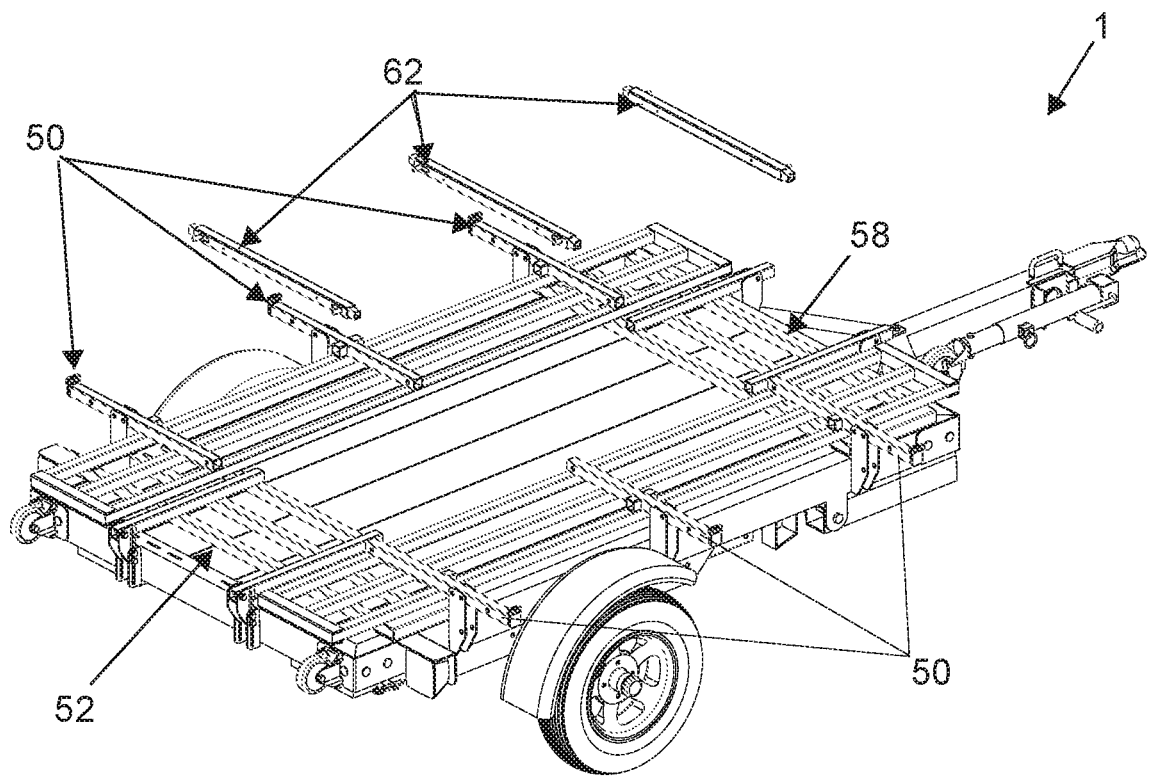

FIG. 4C depicts one embodiment of an isometric view of an improved folding trailer, with its cargo-containing sides/gates disposed in a flat-folded configuration against the bed of the improved folding trailer, with three additional struts exploded above that can be used to help convert the improved folding trailer bed's folded sides/gates into a cargo rack.

Figure 4D:
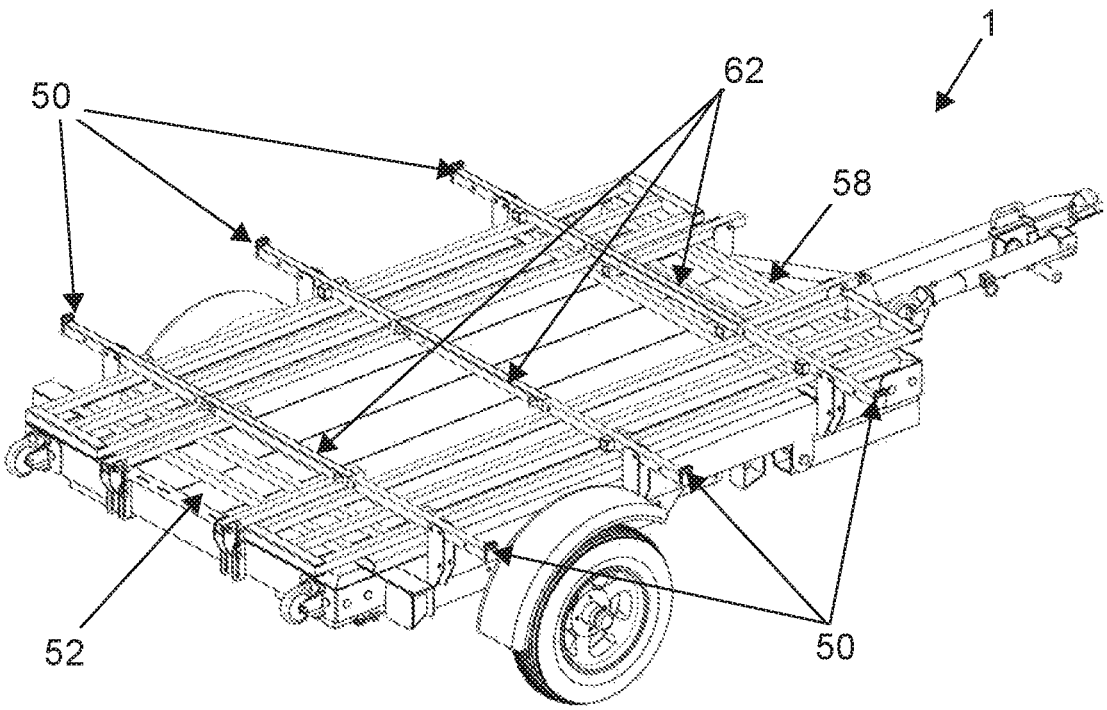

FIG. 4D depicts one embodiment of an isometric view of an improved folding trailer, with its cargo-containing sides/gates disposed in a flat-folded configuration against the bed of the improved folding trailer, with the three additional struts of FIG. 4C installed across the folded left and right folded sides/gates so that the improved folding trailer bed provides a cargo rack.

Figure 4E:
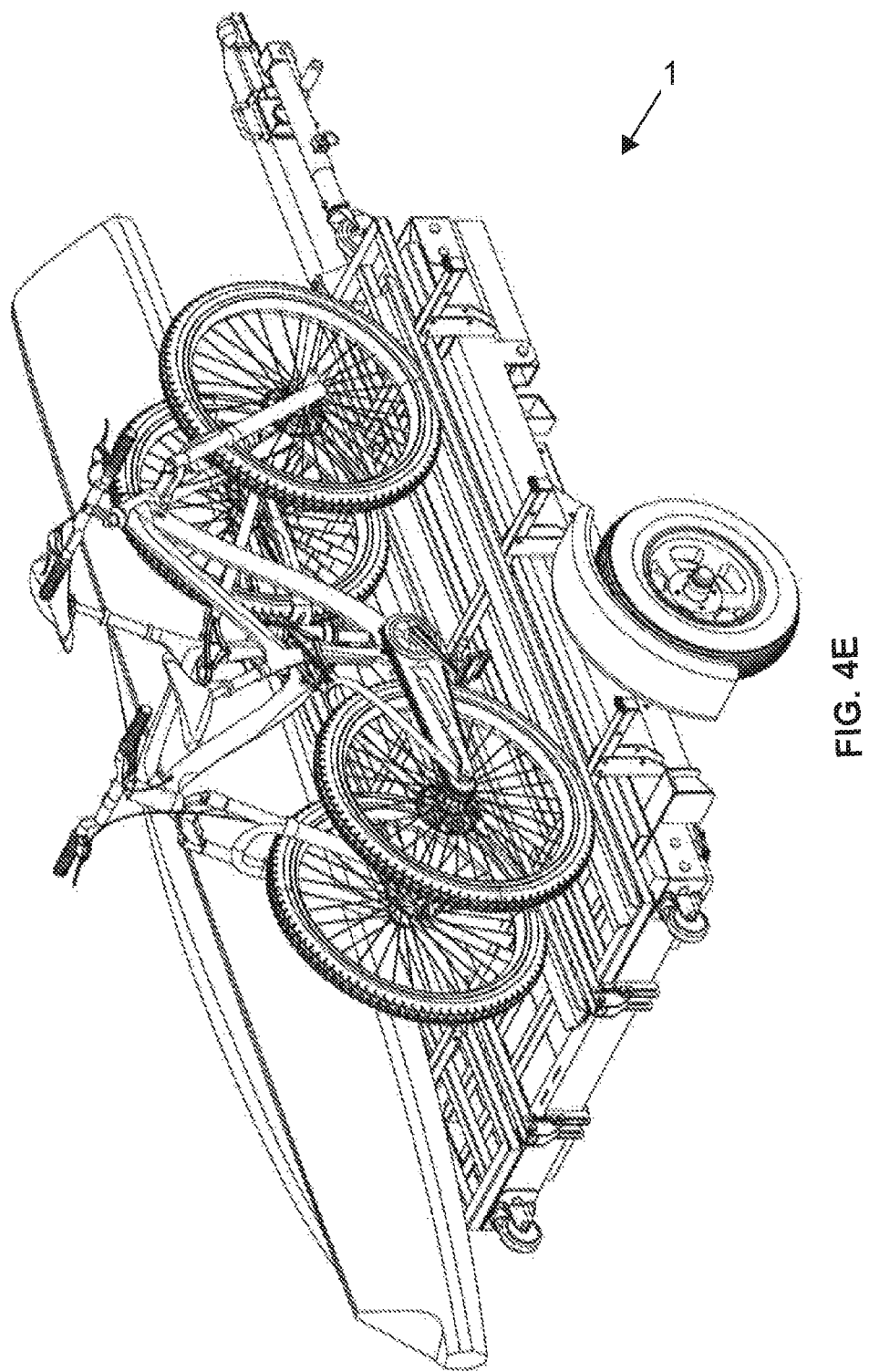

FIG. 4E depicts the improved folding trailer of FIG. 4D with actual example cargo placed on the newly formed cargo rack.

DETAILED DESCRIPTION

I. Overview

The inventive disclosures described herein pertain to an improved folding trailer for stowage that, in many embodiments, is comprised of a hinged trailer tongue, an integral winch, and a means to power the winch. More specifically, this folding-trailer configuration significantly minimizes the physical exertion required of a user to fold or unfold the trailer, significantly reduces the potential for serious user injury during the folding/unfolding process, and greatly reduces the time required to fold and unfold the trailer.

In embodiments, the integral winch folds the improved folding trailer and the trailer tongue in a jackknife fashion for storage by means of an external power source that can be easily coupled and decoupled from the mechanical winch device. In many variations, the external power source attaches to winch drive shaft on the outside of the trailer bed, at a safe distance from the trailer. The integral winch requires minimal torque to operate, and in some embodiments, a means to manually operate the mechanical winch is provided. In typical embodiments, however, a small external power source, including but not limited to, a cordless drill, can easily supply the mechanical power required to fold/unfold the trailer.

In some embodiments, the power source for operating the winch is by way of an integrated electric motor, which is coupled to the winch gearing. In variations, the winch motor is powered by an onboard rechargeable battery and/or an external electric-cable connection to the trailer and can be controlled with a handheld wireless remote-control device to allow a user to stand a safe distance from the trailer as it is being folded or unfolded. In some cases, the power to the cable can be supplied via a nearby automobile. In some variations, the electric power supplied by a nearby automobile is by way of one of many standard trailer-cable connection configurations known in the art, while in other variations, the electric power can come from a power outlet internal to the nearby automobile or from another standard 120-VAC outlet using a typical AC-DC converter known in the art.

Finally, in many embodiments, the improved folding trailer also features collapsible sides and tailgate on the flatbed portion (/cargo area) of the trailer, with multiple extended configurations possible to provide robust cargo-storage/hauling capabilities.

II. Terminology

The terms and phrases as indicated in quotes (" ") in this Section are intended to have the meaning ascribed to them in this Terminology Section applied to them throughout this document, including the claims, unless clearly indicated otherwise in context. Further, as applicable, the stated definitions are to apply, regardless of the word or phrase's case, to the singular and plural variations of the defined word or phrase.

The term "or", as used in this specification, drawings, and the appended claims, is not meant to be exclusive; rather, the term is inclusive, meaning "either or both".

References in the specification to "one embodiment", "an embodiment", "a preferred embodiment", "an alternative embodiment", "a variation", "one variation", and similar phrases mean that a particular feature, structure, or characteristic described in connection with the embodiment is included in at least an embodiment of the invention. The appearances of the phrase "in one embodiment" and/or "in one variation" and similar phrases in various places in the specification are not necessarily all meant to refer to the same embodiment.

The term "couple" or "coupled", as used in this specification, drawings, and the appended claims, refers to either an indirect or a direct connection between the identified elements, components, or objects. Often, the manner of the coupling is related specifically to the manner in which the two coupled elements interact.

The term "removable", "removably coupled", "readily removable", "readily detachable", "detachably coupled", and similar terms, as used in this specification, drawings, and the appended claims, refer to structures that can be uncoupled from an adjoining structure with relative ease (i.e., non-destructively and without a complicated or time-consuming process) and that can also be readily reattached or coupled to the previously adjoining structure.

Directional and/or relational terms such as, but not limited to, left, right, nadir, apex, top, bottom, vertical, horizontal, back, front, lateral, proximal, and distal are relative to each other, are dependent on the specific orientation of an applicable element or article, are used accordingly to aid in the description of the various embodiments, and are not necessarily intended to be construed as limiting in this specification, drawings, and the appended claims.

As applicable, the terms "about" or "generally", as used herein unless otherwise indicated, means a margin of +−20%. Also, as applicable, the term "substantially" as used herein unless otherwise indicated means a margin of +−10%. It is to be appreciated that not all uses of the above terms are quantifiable such that the referenced ranges can be applied.

III. An Improved Folding Trailer for Stowage

This Section III is directed generally to an improved folding trailer that is designed to minimize its stowage footprint. Refer to FIGS. 1A through 1J, which are focused primarily on the improved folded-storage configuration; refer to FIGS. 2A through 2G-A, which are focused primarily on the improved trailer's 1 collapsible and configurable cargo-containment members (e.g., sides/walls, racks/rails, and tailgate); refer to FIGS. 3A-A through 3D-B, which are focused primarily on the improved swivel jack configuration; and refer to FIGS. 4A through 4E, which are focused on an alternate configuration of improved folding trailer's collapsible and configurable cargo-containment members and additional rail members to form flatbed cargo racks. For reference purposes, the end of the improved folding trailer 1 where the trailer tongue 4 is disposed is shall be considered the "front" of the trailer 1, and the opposite end as the "rear" of the trailer 1. Further, the end of the trailer tongue 4 that has the tongue coupler 34 shall be considered the "distal" end of the trailer tongue 4, and the opposite end of the trailer tongue 4 considered the "proximal" end.

Figure 1A:
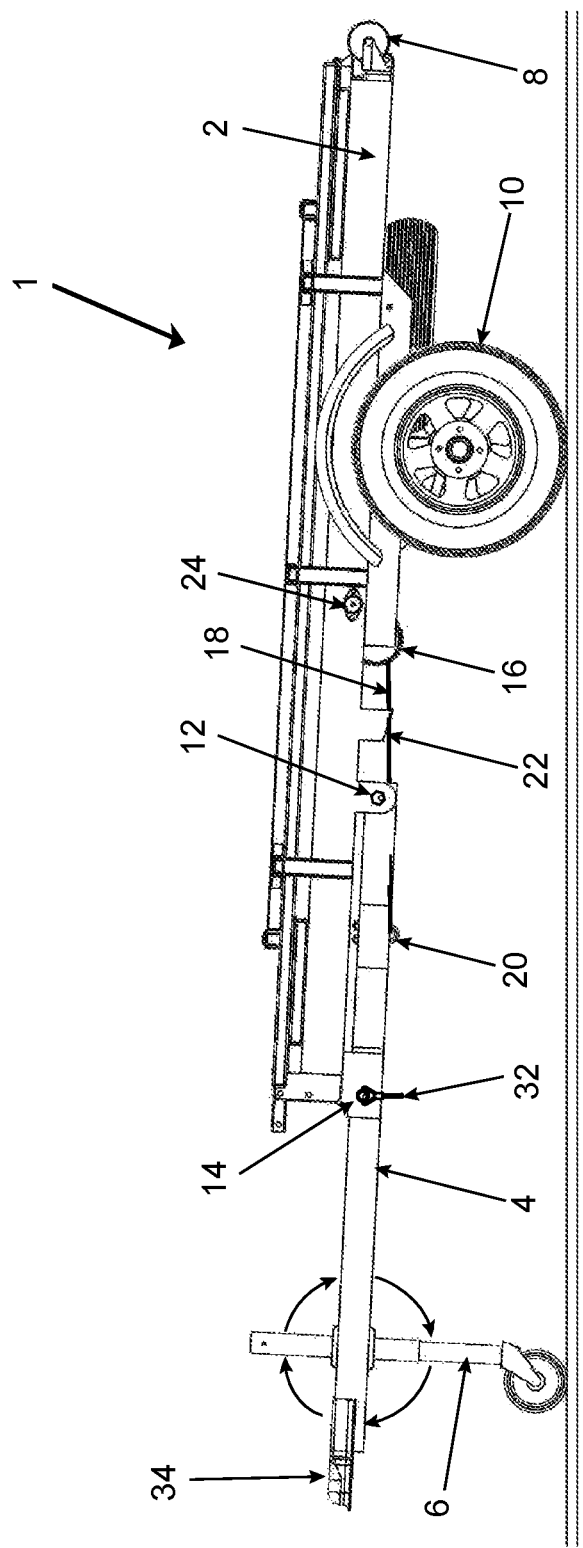
FIG. 1A depicts one embodiment of a left-side view of an improved folding trailer, in an unfolded configuration, though with the collapsible sides on the flatbed portion (/cargo area) not extended and with the swivel-wheel trailer jack in the down position.
Figure 1B:
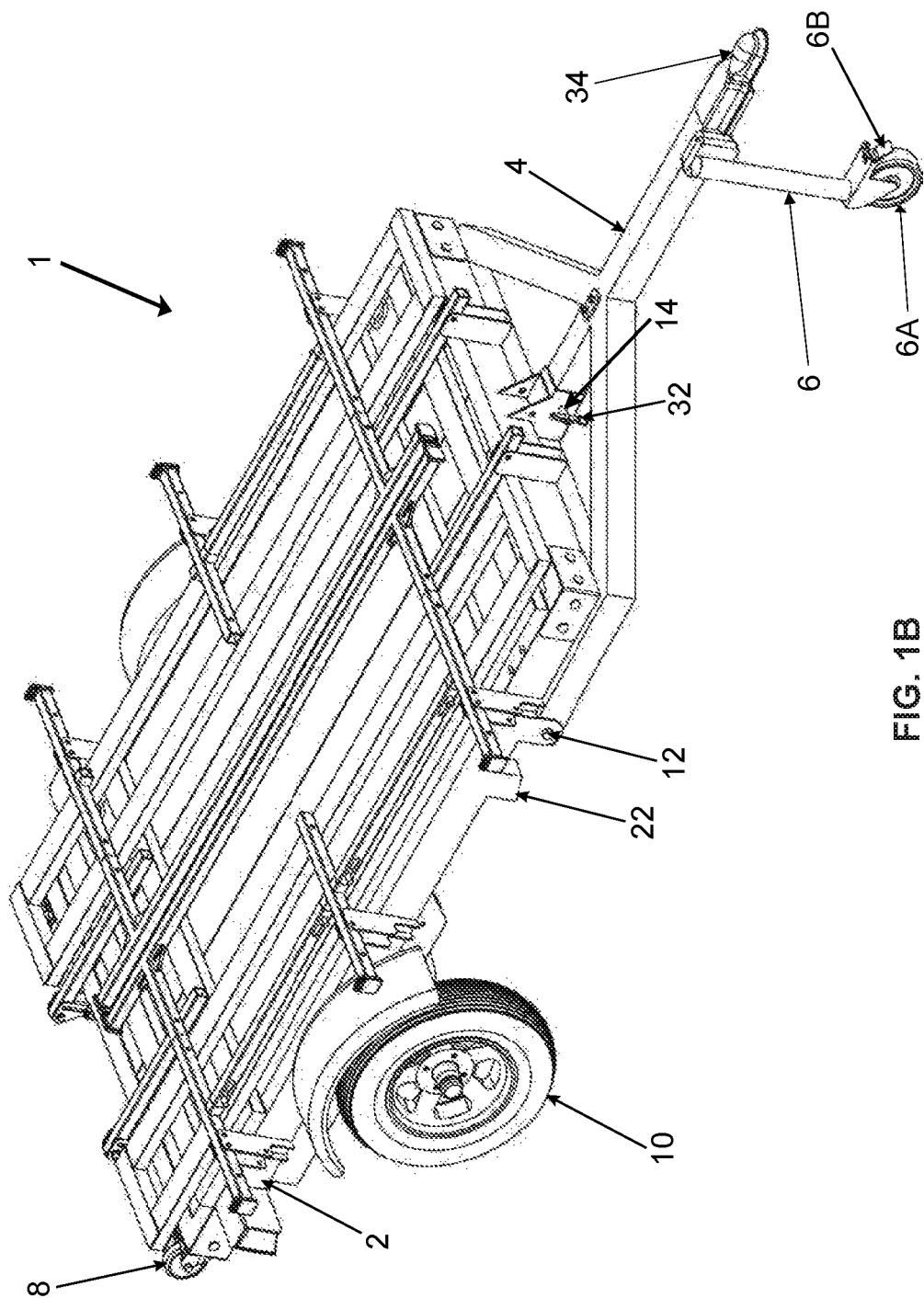
FIG. 1B depicts one embodiment of an isometric top-right-side view of an improved folding trailer, in an unfolded configuration, though with the collapsible sides and tailgate on the flatbed portion (/cargo area) not extended and with the swivel-wheel trailer jack in the down position.
Figure 1C:
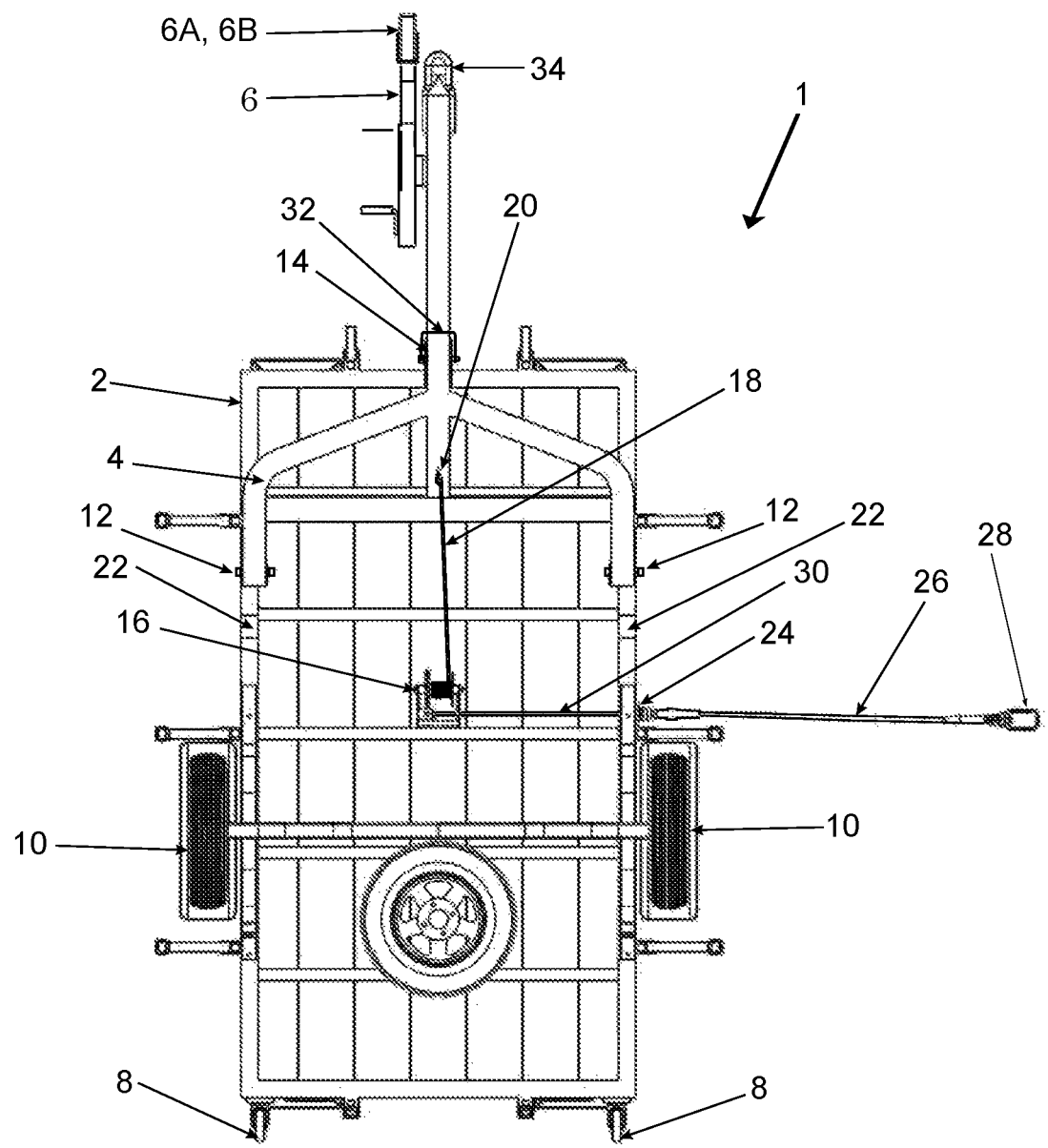
FIG. 1C depicts one embodiment of a bottom view of an improved folding trailer, in an unfolded configuration, with the swivel-wheel trailer jack in the forward-extended position, and featuring the winch drive shaft, the drive-shaft coupler, and a flexible external drive-shaft extension.
Figure 1D:
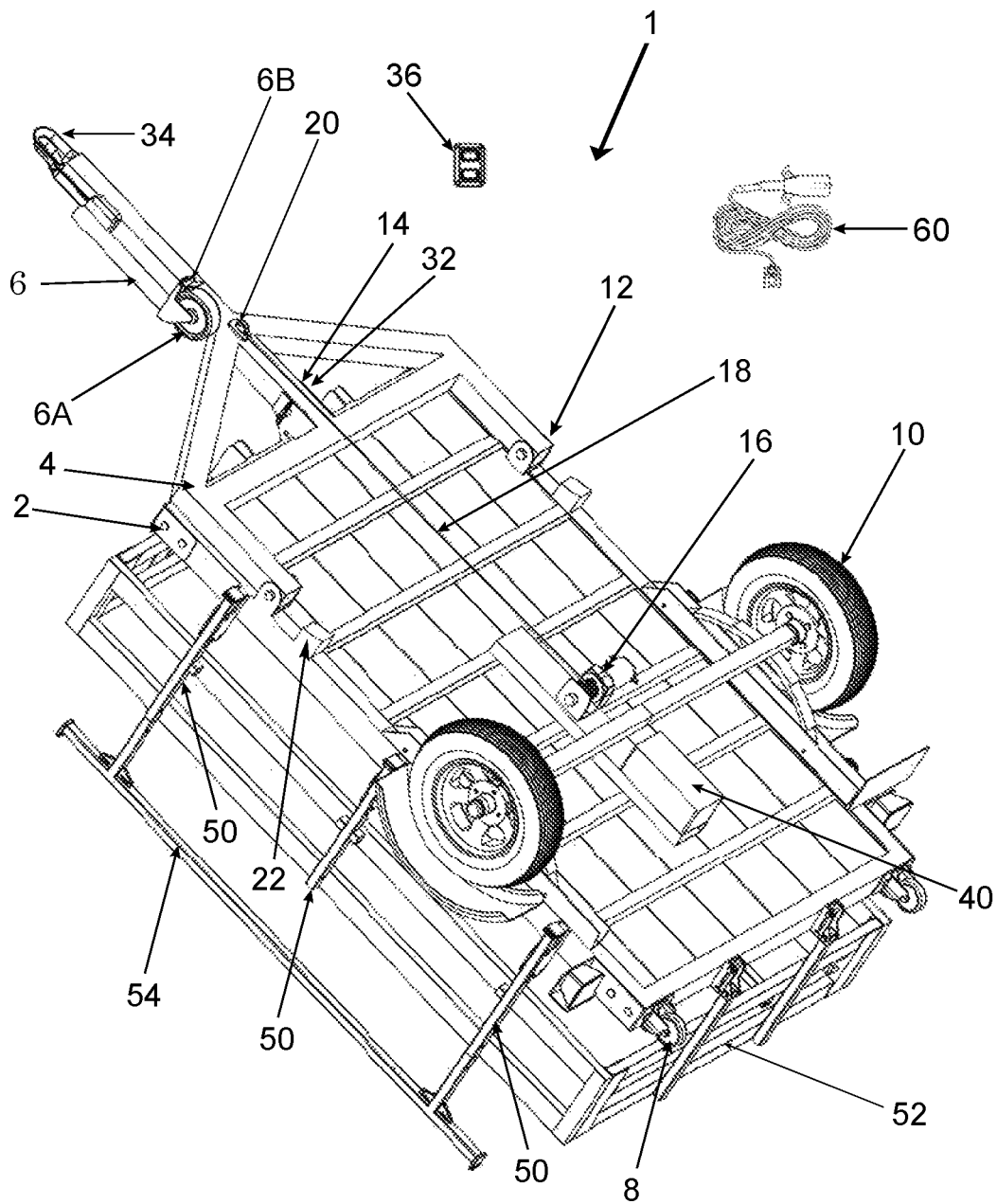
FIG. 1D depicts one embodiment of an isometric rear-bottom-right view of an improved folding trailer, in an unfolded configuration, with the collapsible sides and tailgate on the flatbed portion (/cargo area) extended and with the swivel-wheel trailer jack placed in in an up, rearward position for connection to a tow vehicle, and featuring an optional motorized winch-motor-and-control box.
Figure 1E:
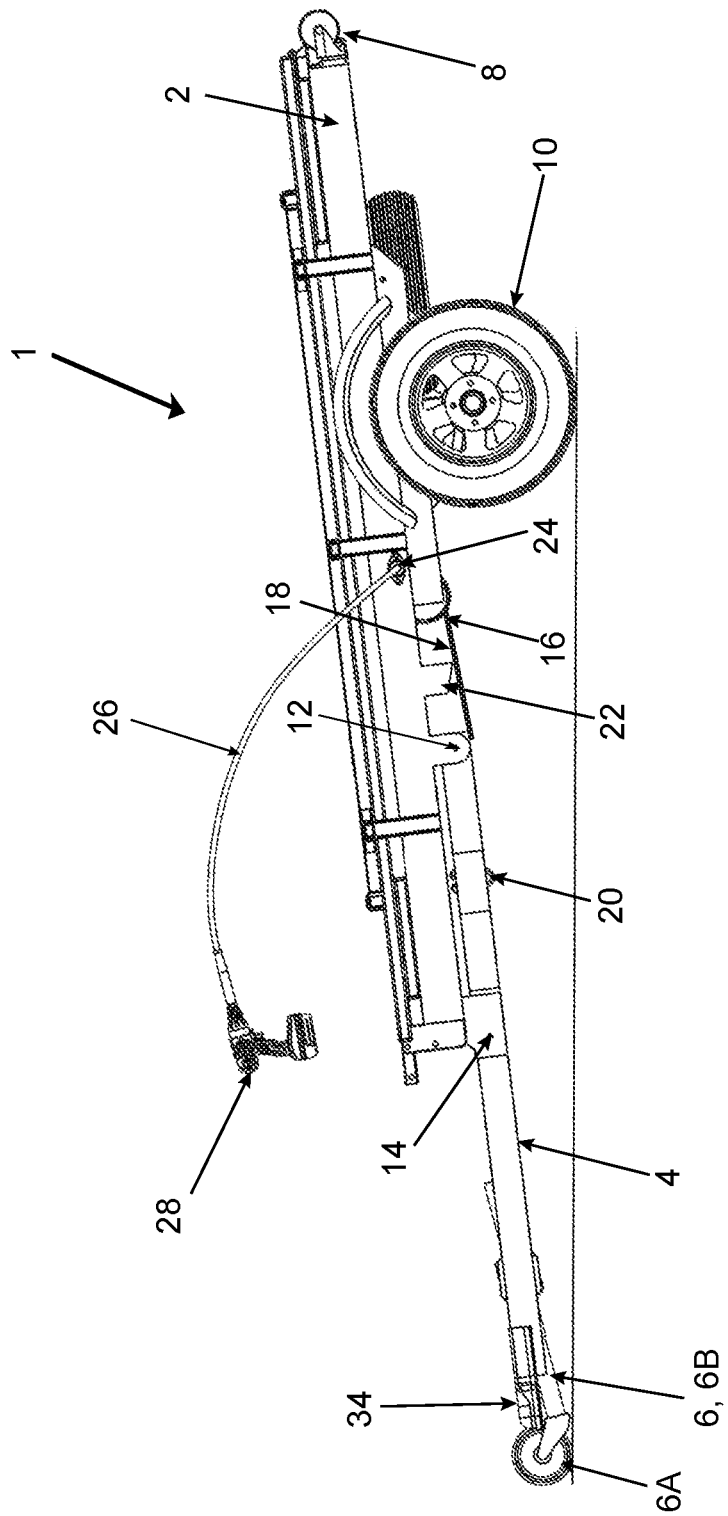
FIG. 1E depicts one embodiment of a left-side view of an improved folding trailer, in an unfolded configuration, though with the collapsible sides and tailgate on the flatbed portion (/cargo area) not extended and with the swivel-wheel trailer jack in the forward-extended position (with the swivel-wheel trailer jack brake engaged) in preparation for winching the trailer apparatus into a folded stored position.
Figure 1F:
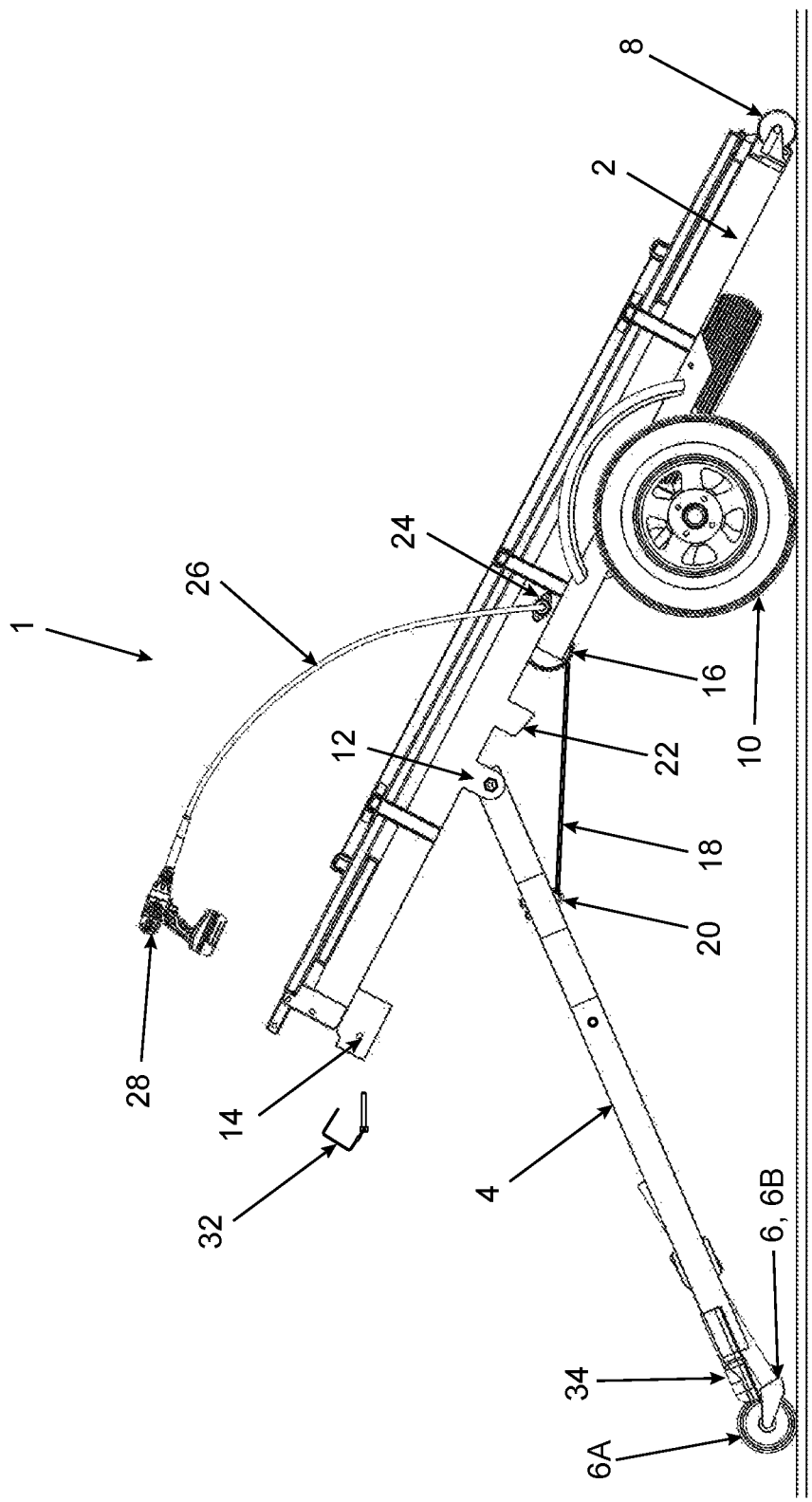
FIG. 1F depicts one embodiment of a left-side view of an improved folding trailer, in a partially folded configuration, with the collapsible sides and tailgate on the flatbed portion (/cargo area) not extended and with the swivel-wheel trailer jack in the forward-extended position in preparation for winching the trailer apparatus into a fully folded stored position.
Figure 1G:
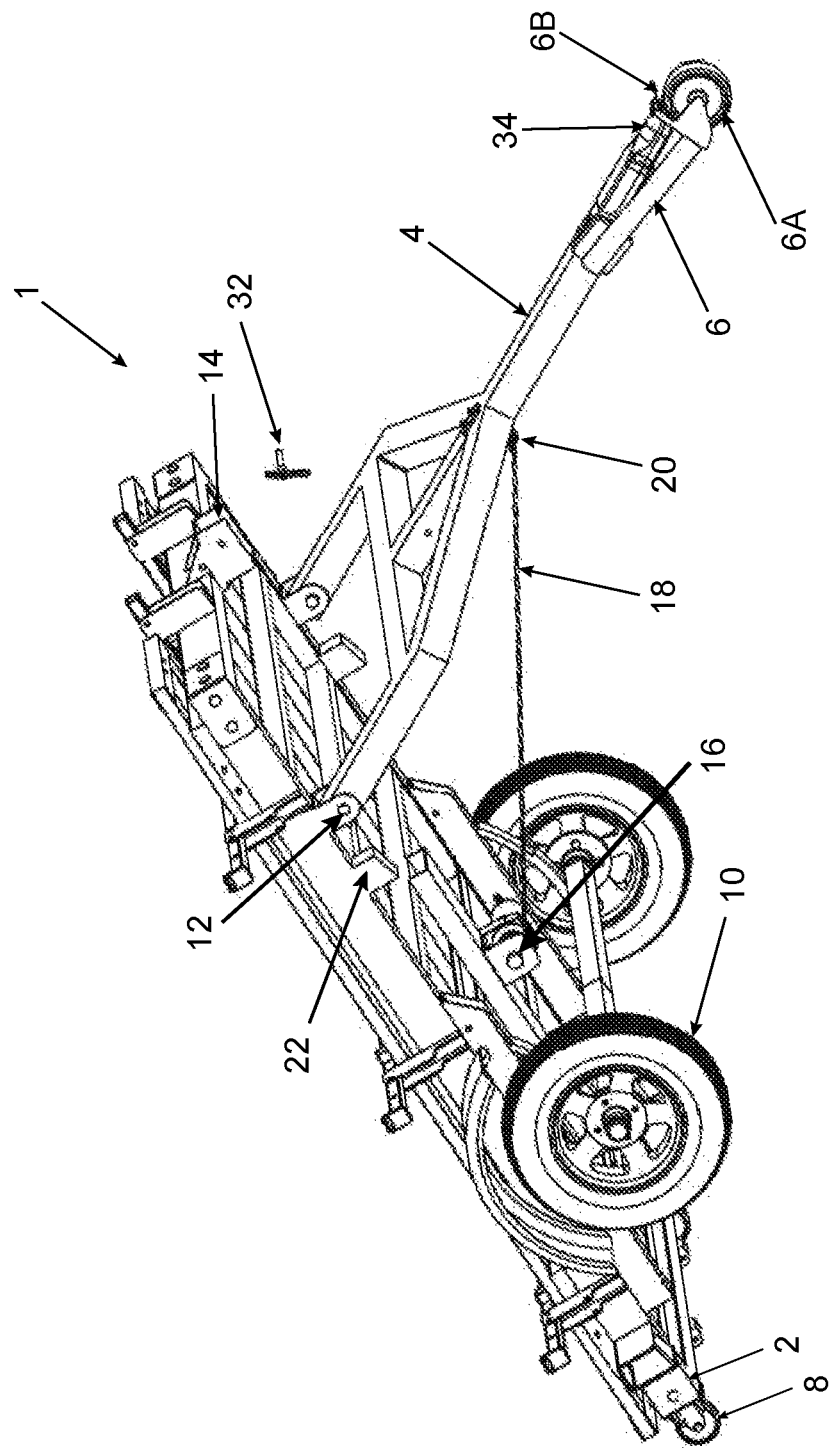
FIG. 1G depicts one embodiment of an isometric front-right-side view of an improved folding trailer, in a partially folded configuration, with the collapsible sides and tailgate on the flatbed portion (/cargo area) not extended and with the swivel-wheel trailer jack in the forward-extended position in preparation for winching the trailer apparatus into a fully folded stored position.

In an embodiment, the trailer bed 2 is attached to the trailer tongue 4 at the hinge bracket 12. The trailer tongue 4 is locked to the trailer bed 2 by means of the integral locking bracket 14, which incorporates flange walls adjacent and parallel to the side walls of the trailer tongue 4. This integral locking bracket 14 and the trailer tongue 4 each have a hole with the same axis pierced laterally through both members 14, 4. This coaxial hole permits the locking pin 32 (or other suitable fastener such, but not limited to, as a threaded bolt, washer, and nut assembly) to pass through both the locking bracket 14 and the trailer tongue 4 in order to lock the trailer tongue 4 in the extended position, as shown, e.g., in FIGS. 1A through 1C. FIGS. 1C-A through 1I depict the locking pin 32 removed from the integral locking bracket 14 and trailer tongue 4 to facilitate the folded-storage configuration of the trailer.

In additional embodiments, the tongue coupler 34 is attached to the distal end of the trailer tongue 4. The swivel-wheel trailer jack 6, which includes a wheel 6A and a manually operated wheel brake 6B, is mounted to the side wall of the trailer tongue 4 in between the locking bracket 14 and the tongue coupler 34. Typically, the jack mechanism for the swivel-wheel trailer jack 6 is of a telescoping type, well-known in the art.

In variations, the telescoping swivel-wheel trailer jack 6 can be pivoted and locked in three positions: In FIGS. 1A and 1B and in FIGS. 2A through 2D, the swivel-wheel trailer jack 6 is shown locked in the vertical position. As shown in FIG. 1C and FIGS. 1E through 1J, the swivel-wheel trailer jack 6 is placed in a locked position with its swivel wheel 6A disposed slightly below and beyond the tongue coupler 34, and pointed toward the front of the trailer 1. This second position ensures that the swivel wheel on the swivel-wheel trailer jack 6 remains in contact with the floor/ground while the trailer 1 folds to the optimum angle for storage. It should be noted that for safety, the swivel-wheel trailer jack wheel brake 6B should be engaged during trailer-folding operations to prevent uncontrolled travel during folding operations. When the trailer 1 is being towed, the swivel-wheel trailer jack 6 is in a locked, retracted-up position with its telescoping shaft and wheel parallel to the trailer tongue 4 pointed toward the rear of the trailer 1.

Figure 3B:
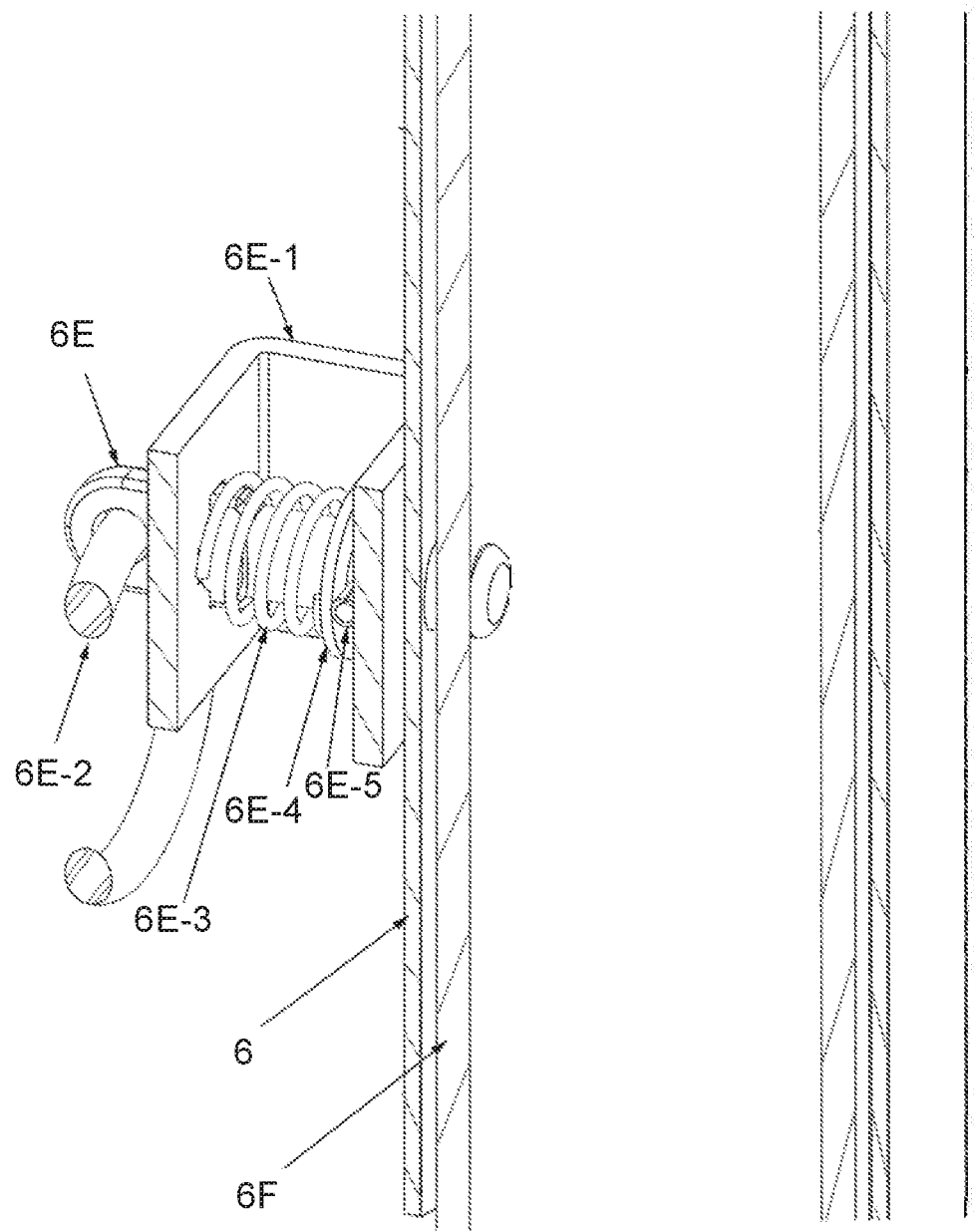

Referring to FIGS. 3A-A through 3D-B, in some embodiments, the improved swivel jack 6 features a locking pin 6E adapted to be engaged in two aligned holes in predetermined locations in order to ensure that the effective length of the swivel jack 6 is such that the swivel jack wheel 6A and outer and inner telescoping tubes 6, 6F line up perpendicular to the ground when the improved folding trailer 1 is in its folded/stowed position to ensure optimum stability and to facilitate ease of travel for repositioning the improved trailer 1 in a storage setting. In some respects, the telescoping swivel jack 6 has common features known in the art, such as a gear box 6C and gear-box handle 6D for extending the telescoping tubes 6, 6F to raise/extend and lower/retract the swivel jack 6. In a typical variation, the locking pin 6E includes a bracket 6E-1, a compressible spring 6E-3, a spring pin 6E-5, a spring washer 6E-4, and a pin ring 6E-2.

In some variations, as depicted in FIGS. 3C-A, 3C-B, and 3C-C, the improved trailer swivel jack's 6 locking-pin 6E assembly is used to fix the positions of the telescoping inner and outer jack tubes 6F, 6 relative to each other at a predetermined point. In FIG. 3C-A, the locking pin 6E is shown disengaged with the spring 6E-3 compressed as the pin 6E is butted against the outer jack-tube wall 6 and is not aligned to be inserted in the pre-fabricated hole in the inner jack tube 6F. In FIG. 3C-B, the locking pin 6E is shown fully engaged with the prefabricated hole in the inner jack tube 6F, with the locking-pin spring 6E-3 uncompressed. In FIG. 3C-C, the locking pin 6E is shown disengaged with the spring 6E-3 compressed and with the locking pin 6E rotated about 90 degrees so that the locking pin 6E will remain disengaged even if the locking pin 6E is aligned with the holes in the inner and outer jack tubes 6F, 6.

In other embodiments, as depicted in FIGS. 3D-A and 3D-B, the improved folding trailer 1 features a swivel jack 6 is in its front-extended position to facilitate trailer folding, wherein there is visual indictor on the improved swivel jack's outer and inner tubes 6, 6F to aid a user in determining is the jack is extended to the ideal position for trailer-folding operations in order to ensure optimum stability of the improved folded trailer 1 when it is in its completely folded configuration. In the case of FIG. 3D-A, the visual indicator is in the form of a line and/or scoring 6G on the inner swivel-jack tube 6F that is to be positioned, ideally, just below the lower edge of the outer swivel-jack tube 6. In the case of FIG. 3D-B, the visual indicator is in the form of two mating arrows 6H (or similar graphical indictors), one on the outer swivel-jack tube 6 and the other on the inner swivel-jack tube 6F.

In many embodiments, an integral winch 16 is mounted to the bottom surface of the trailer bed (also sometimes referred to as a flatbed) 2, substantially laterally centered between the left and right sides of the trailer bed 2, and longitudinally in front of the trailer wheels 10 so that the wheels 10 do not interfere with a user's access to the winch drive shaft 30 and associated drive-shaft coupler 24. In typical embodiments, one end of the winch cable 18 is attached to the winch-cable anchor 20, which is mounted to the underside of the trailer tongue 4. In many variations, the drive-shaft coupler 24 provides a connection point for an external power source 28, whether the external power source 28 is an electric hand-held power tool, a large hand crank for manual operation (which is part of a less-optimal embodiment, since manual operations represent extra exertion and risk to a user), or some other powered device adapted to couple to the drive-shaft coupler 24. In one preferred configuration, the integral winch 16 incorporates, but is not limited to, a worm-gear mechanism that prevents the winch cable (in many typical applications, a steel-wire-strand cable) 18 from accidentally and/or uncontrollably deploying and uncoiling. In variations, the external power source is a hand-held portable electric drill 28. For example, in some applications, such a drill 28 can be a Ryobi® 18-VDC cordless drill that is rated at 340 in-lbf of torque and 440 RPM (unloaded). Of course, one ordinarily skilled in the art will recognize that the type, size, and power/torque ratings of a hand-held power drill 28 can be varied up or down to accommodate differently sized applications (trailer sizes and mass), worm-gear ratios, etc.

In an alternate configuration, an electric-motorized winch (hoist winch) 40, 16 is installed on the improved folding trailer that can be plugged into a compatible electric-power source/outlet (and, depending on the type of motor, feeding such external electric power through an appropriate AC-DC power converter to drive the motor 40) via a cable 60 and/or is powered by a rechargeable battery 40 that is disposed on the trailer 1. In many applications that employ a rechargeable battery 40, the ability to charge such a rechargeable battery 40 is incorporated by providing convenient access to the battery-charging terminals with an externally powered charging device and/or by also including an onboard charger/power converter that can be plugged into a compatible electric-power source/outlet or to a nearby motor vehicle capable of providing the required power via a long power cable 60. For example, in some applications, an extended power cable 60 is used to connect the trailer 1 to the trailer-towing-cable outlet (e.g., a seven-pin cable connector or other common trailer connector) of a nearby motorized vehicle. Further variations include local switch controls to govern motorized-winch 40,16 operations, including, in some applications, providing any safety interlocks to prevent winch 40, 16 operations when the trailer tongue 4 is still locked in its extended position. In additional variations, a hand-held wireless remote-control device 36 is used to control motorized-winch 40, 16 operations.

In still more embodiments, a coupled external power source 28 transmits rotational force through a flexible drive-shaft extension 26, through the drive-shaft coupler 24, and through the winch drive shaft 30, in order to drive the integral winch 16 to recoil the winch cable 18. In additional variations, the integral winch 16 employs a gear ratio that turns the high-speed revolutions of the external power source 28 into low-speed/high-torque power, forcing the trailer tongue 4 to pivot at the hinge bracket 12 in a downward fashion which in turn raises the front of the trailer bed 2. In one example application, the winch 16 is a Harbor Freight® worm-gear winch with a 40:1 worm-gear drive ratio with a cog gear with a 5.25-in. outside diameter and a worm screw with a 1.25-in. outside diameter.

In even more variations, the integral winch 16 and winch drive shaft 30, and drive-shaft coupler 24 are adapted to be used with a flexible external drive shaft 26 whereby an external power source 28 connects to the drive-shaft coupler 24 and where the external power source 28 is detachably coupled to the drive-shaft coupler 24. In some applications, such a flexible external drive shaft 26 can be made of a flexible, yet sturdy material such as polymeric tubing, with or without wire-mesh sheathing, or carbon-fiber composite. In one example application, the flexible external drive shaft 26 is fashioned from an Enkay® Flex Shaft (with a ¼-in. chuck). In some alternative applications, the flexible external drive shaft 26 can be a rigid shaft that includes a universal joint between the shaft and the aforementioned chuck, thus allowing the rigid version of the flexible external drive shaft 26 to be easily moved while still being effective.

In some embodiments, positioned behind the hinge bracket 12 is a folding-tongue stop 22, with a folding-tongue stop 22 typically disposed on each of the left and right side of the bottom of the trailer bed 2. The folding-tongue stop 22 prevents the trailer tongue 4 from pivoting beyond the predetermined optimal angle, which can vary based on the trailer's 1 dimensions, in order to ensure the stability of the fully folded trailer 1.

In other embodiments, two or more rear caster wheels 8 are mounted to the rear of the trailer bed 2, and said rear caster wheels 8 both help protect the rear of the trailer when in a folded ("jackknife") configuration as well as facilitate (in conjunction with the swivel wheel on the swivel-wheel trailer jack 6) the movement/repositioning of the completely folded trailer 1 when in storage. Once the folding trailer 1 has been completely winched into its "jackknife" position (see FIGS. 1H and 1I), the trailer wheels 10 are no longer making contact with the floor/ground, and weight of the trailer is born by the wheel on the swivel-wheel trailer jack 6 and the two or more rear caster wheels 8, including during any repositioning (e.g., rolling and turning) along the floor/ground.

Figure 1H:
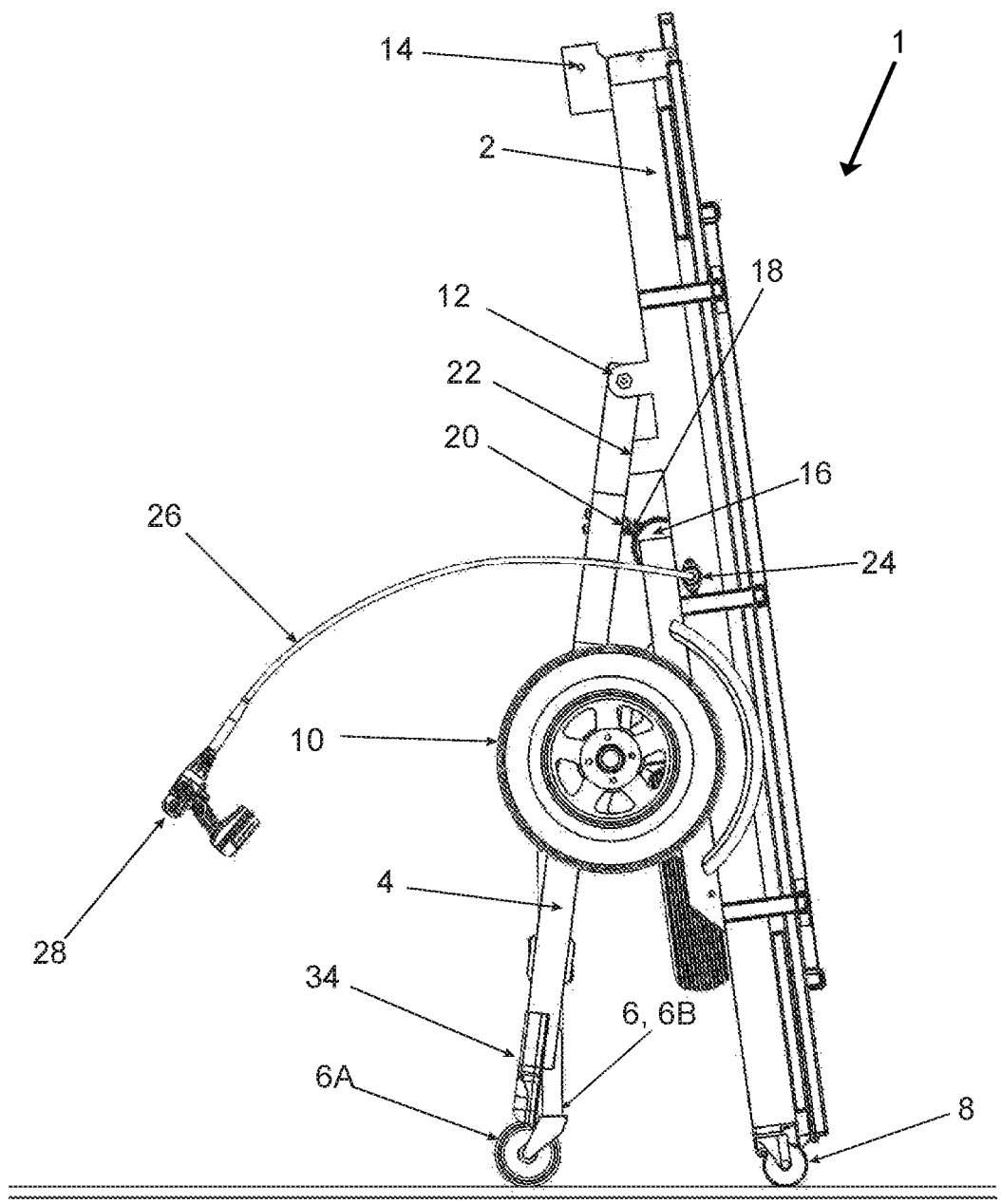
FIG. 1H depicts one embodiment of a left-side view of an improved folding trailer, in a fully folded configuration for storage, with the collapsible sides and tailgate on the flatbed portion (/cargo area) not extended and with the swivel-wheel trailer jack in the forward-extended position.
Figure 1I:
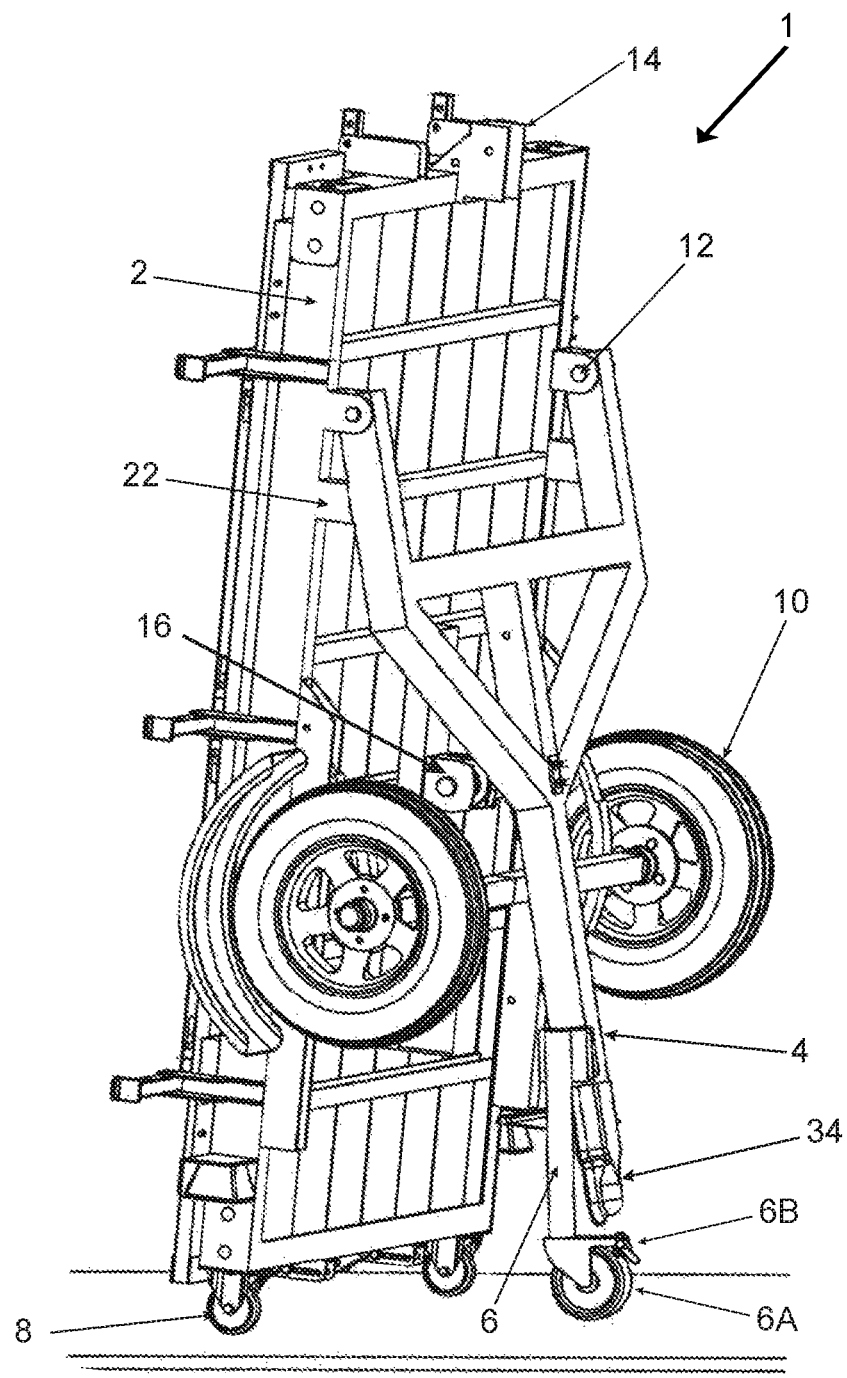
FIG. 1I depicts one embodiment of an isometric front-right-side view of an improved folding trailer, in a fully folded configuration for storage, with the collapsible sides and tailgate on the flatbed portion (/cargo area) not extended and with the swivel-wheel trailer jack in the forward-extended position.

FIGS. 1H and 1I each show an embodiment of the improved folding trailer 1 folded to the optimum angle ("jackknife" position). The improved folding trailer 1 is folded to an angle where it minimizes the required floor/ground stowage space while offering a stable "tripod" stance.

Figure 1J:
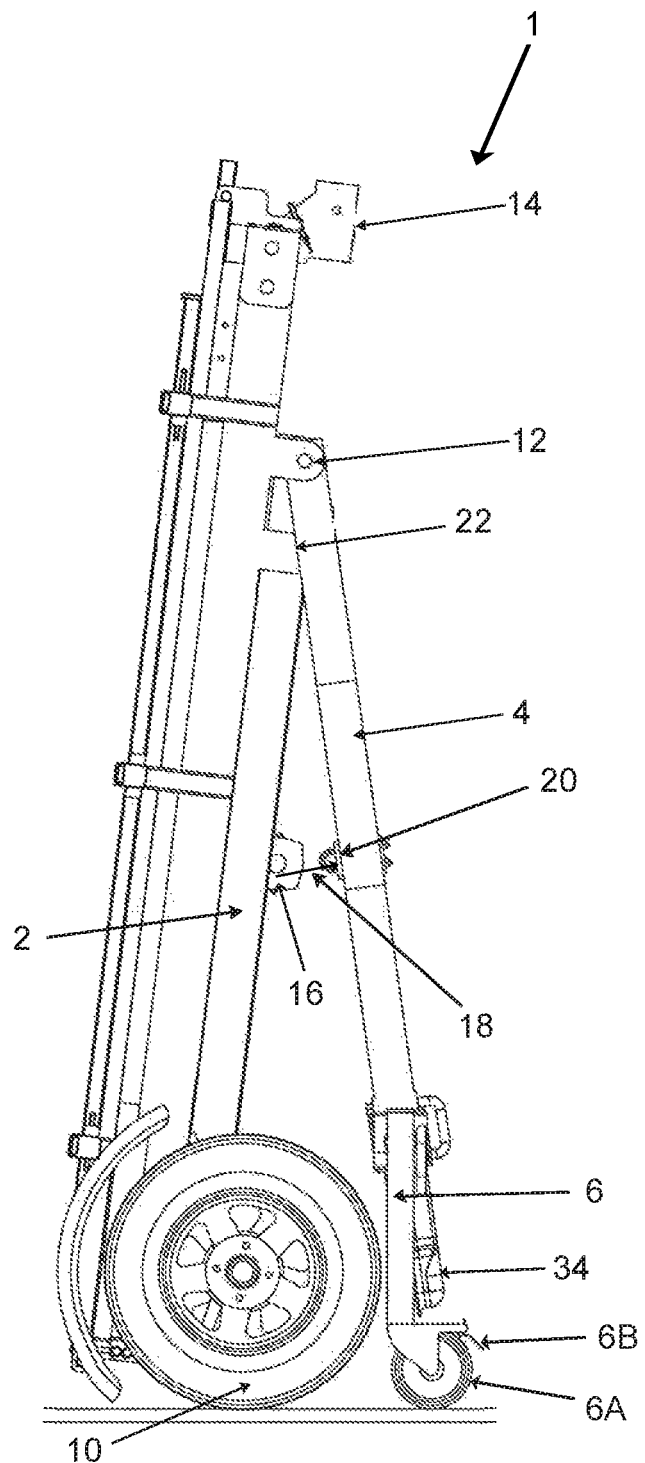
FIG. 1J depicts one alternative embodiment of a right-side view of an improved folding trailer, in a fully folded configuration for storage, with the collapsible sides and tailgate on the flatbed portion (/cargo area) not extended and with the swivel-wheel trailer jack in the forward-extended position; however, in this embodiment, there are no rear caster wheels and the folded trailer relies on the trailer's most-rearward main load-bearing wheels in place of the rear caster wheels used in other embodiments.

In one alternative embodiment, and referring to FIG. 1J as an example, the trailer 1 either does not have an extended rearward profile beyond the wheels 10 such that the jackknifing and stowage operations are possible without having to employ rear caster wheels 8 and instead relying only on the main trailer wheels 10 (most rearward, for trailers that might have multiple axles) to bear the weight of the trailer 1 with in a full, folded, stowage configuration. In another variation of this scheme, the rear portion of the trailer bed 2 that extends past the most rearward main wheels 10 is configured to be slidably movable such that it can be slid inward over (or under) and towards the main body of the trailer 1, which in turn allows for the most rearward main wheels 10 to be used to bear the trailer's 1 weight when the trailer 1 is folded into its jackknife stowage configuration.

Focusing on FIGS. 2A through 2G-A, in still more embodiments, the improved trailer 1 also features collapsible cargo-containment sides 50, 58 and a configurable tailgate 52. The left and right cargo-containment sides 50 normally lay flat against the trailer bed 2 when the improved trailer 1 is stowed, and then can be folded-out by 90-degrees during use, such the left and right sides 50 are orthogonally disposed relative to the trailer bed 2. The front trailer cargo-containment side 58 is collapsed and deployed in a similar fashion to the left and right cargo-containment sides 50.

Figure 2A:
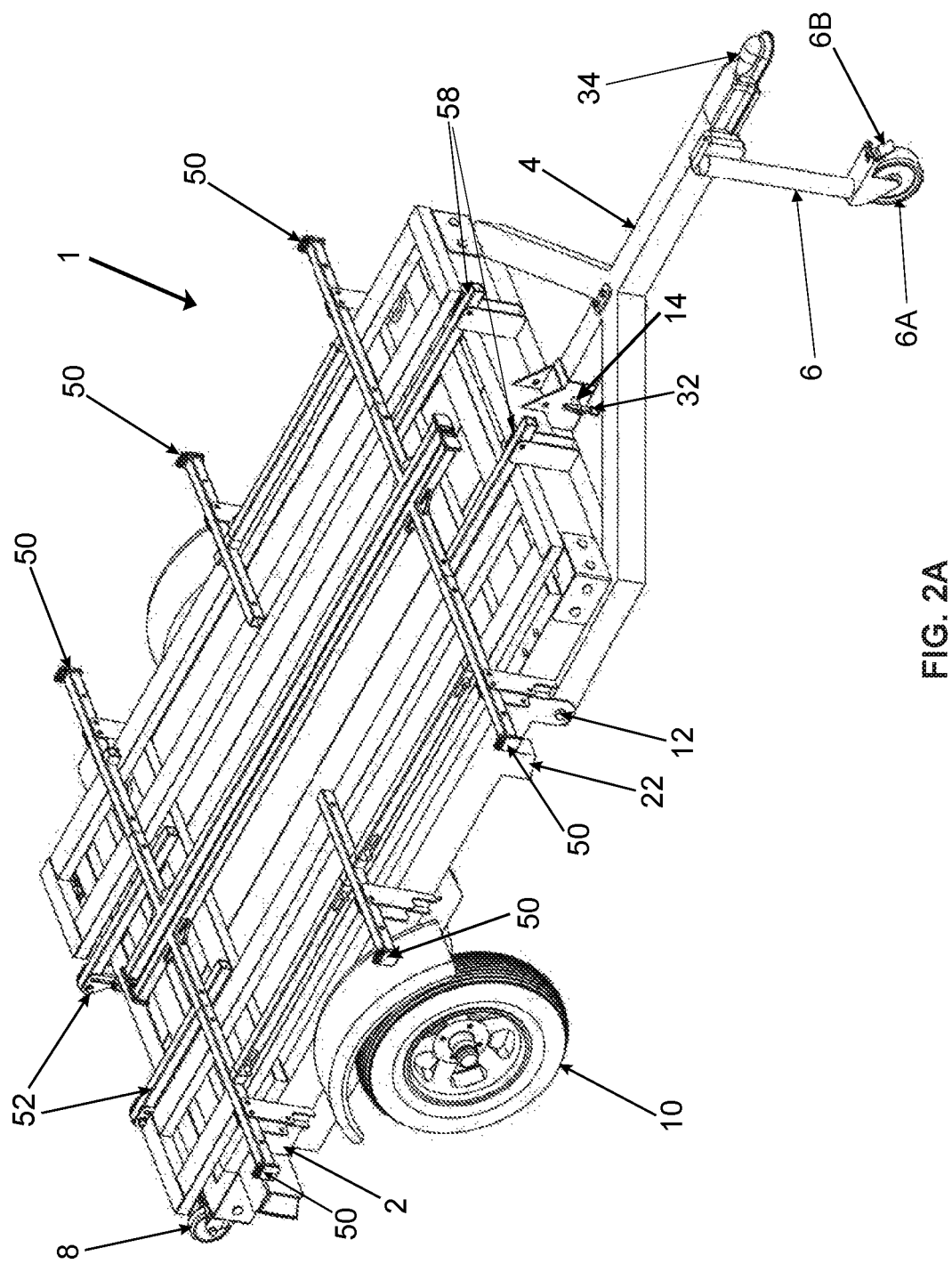
FIG. 2A depicts one embodiment of a left-side view of an improved folding trailer, in an unfolded configuration, and featuring the collapsible sides and tailgate on the flatbed portion (/cargo area) not extended and with the swivel-wheel trailer jack in the down position.
Figure 2B:
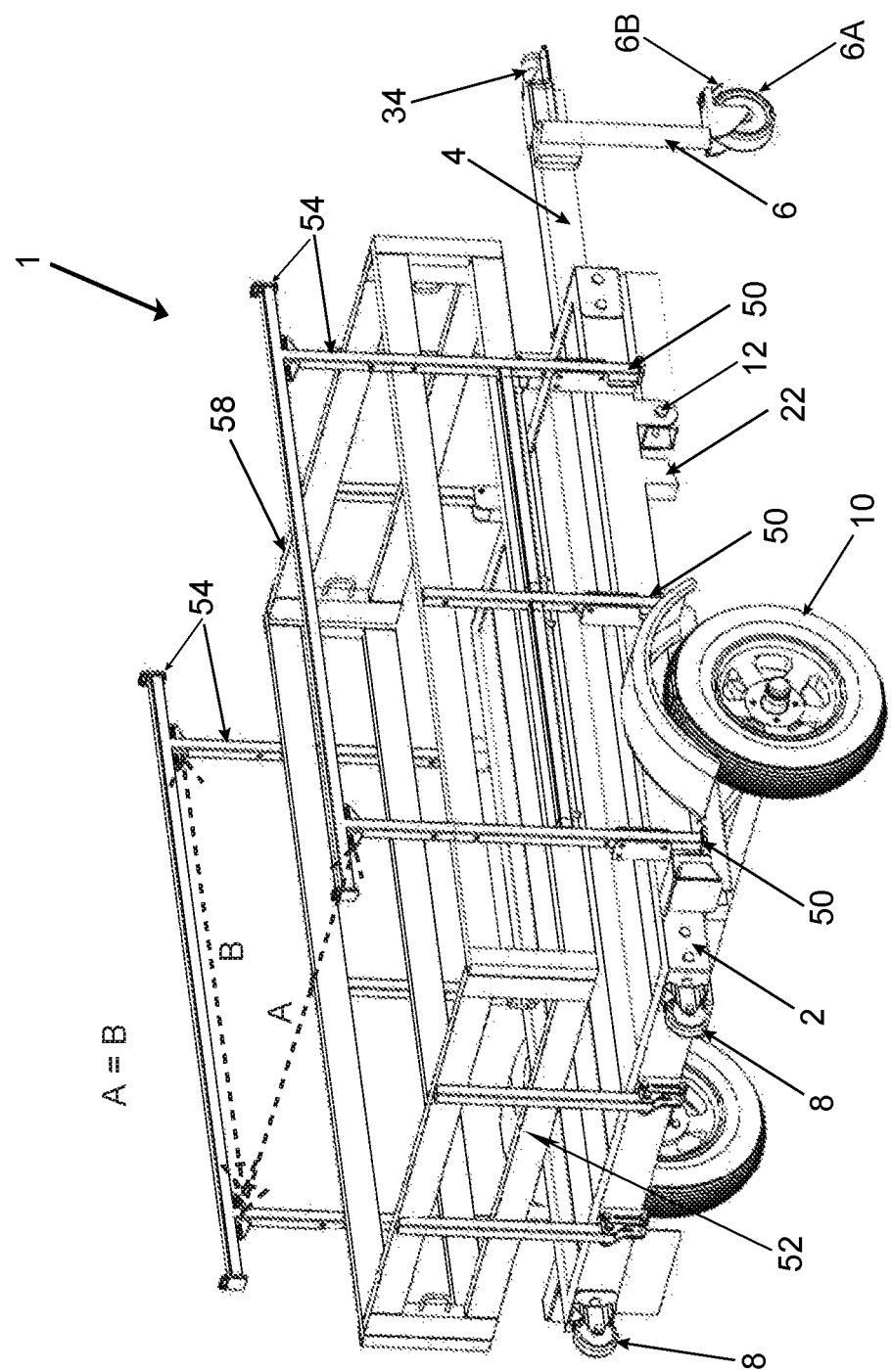
FIG. 2B depicts one embodiment of an isometric rear-right-side view of an improved folding trailer, in an unfolded configuration, and featuring the collapsible sides and tailgate on the flatbed portion (/cargo area) fully extended to form a usable cargo-containment area on the flatbed portion of the trailer, extended cargo-mounting rails that are disposed on the right and left cargo-containment sides in a longitudinal orientation relative to the cargo-containment sides they are disposed on, and with the swivel-wheel trailer jack in the down position.
Figure 2C:
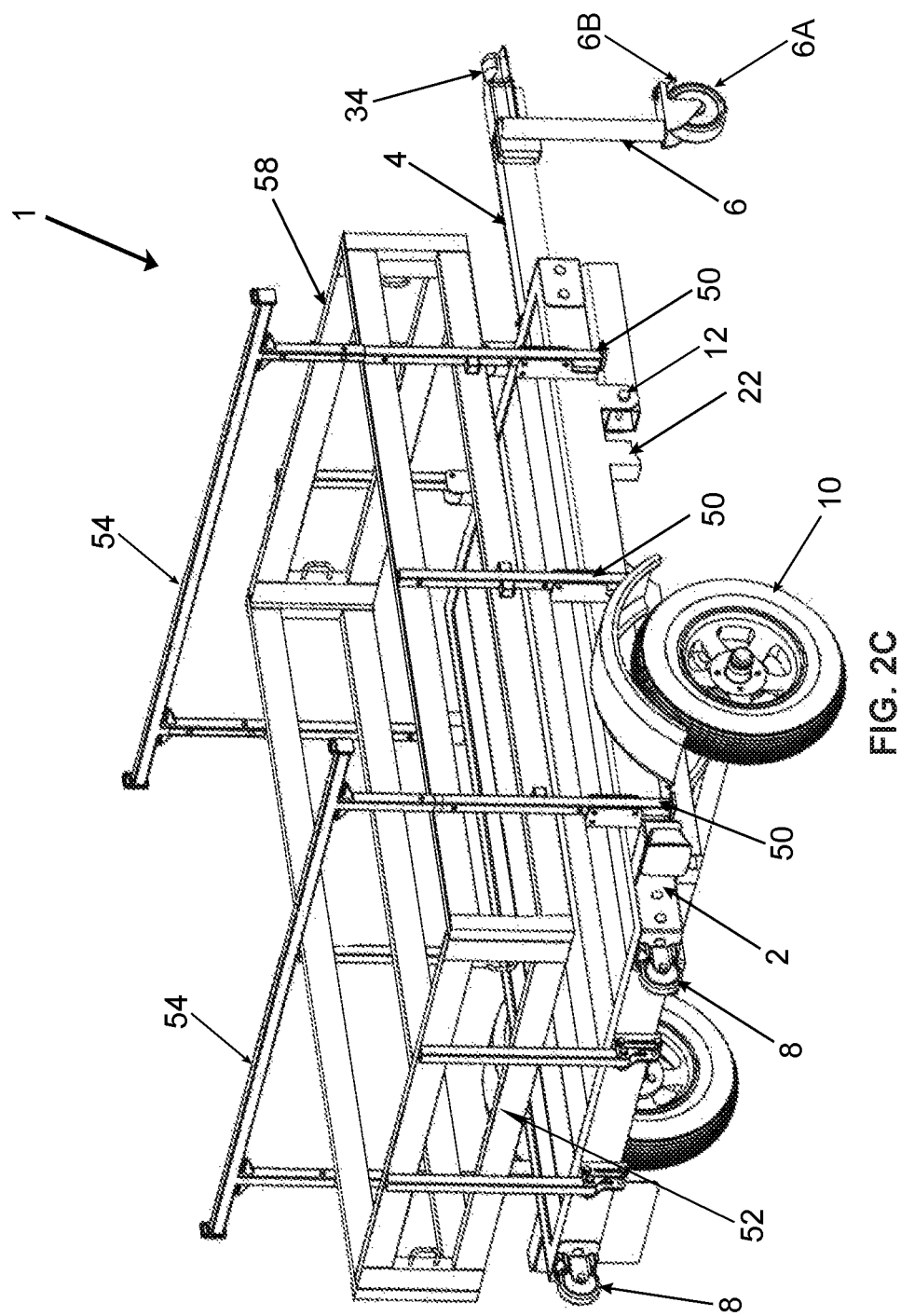
FIG. 2C depicts one embodiment of a rear-right-side isometric view of an improved folding trailer, in an unfolded configuration, and featuring the collapsible sides and tailgate on the flatbed portion (/cargo area) fully extended to form a usable cargo-containment area on the flatbed portion of the trailer, extended cargo-mounting rails that are optionally disposed orthogonally across the right and left cargo-containment sides in a longitudinal orientation relative to the cargo-containment sides they are disposed on, and with the swivel-wheel trailer jack in the down position.
Figure 2D:
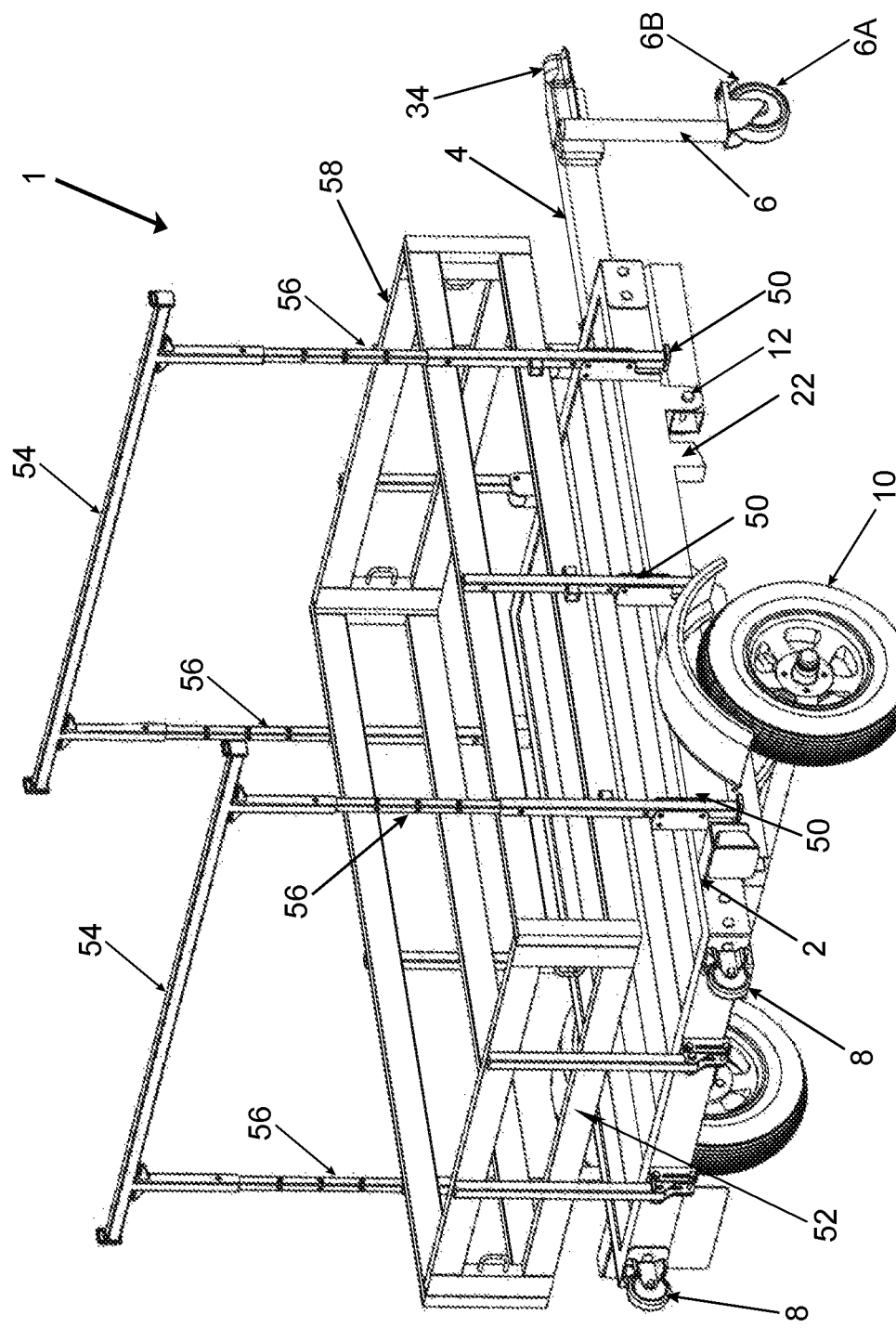
FIG. 2D depicts one embodiment of a rear-right-side isometric view of an improved folding trailer, in an unfolded configuration, and featuring the collapsible sides and tailgate on the flatbed portion (/cargo area) fully extended to form a usable cargo-containment area on the flatbed portion of the trailer, extra-extensions for the cargo-mounting rails that are optionally disposed orthogonally across the right and left cargo-containment sides in a longitudinal orientation relative to the cargo-containment sides they are disposed on, and with the swivel-wheel trailer jack in the down position.

Referring to FIGS. 2B through 2D, in some embodiments, the left and right cargo-containment sides 50 are further equipped with cargo-carrying racks/rails 54, which in many variations are detachably coupled to the cargo-containment sides 50. In many practical applications, as well as to facilitate the foldable stowage of the cargo-containments sides 50, the cargo-carrying racks/rails 54 are disposed to be longitudinally parallel with the cargo-containment sides 50 and the improved trailer 1 as a whole. However, in some alternative embodiments, the width of the trailer bed 2 is substantially equal to the distance between the support vertical struts for each cargo-carrying rack/rail 54 (FIG. 2B depicts the relationship between these two distances, "A" and "B", respectively). This, in turn, allows for a reorientation of the cargo-carrying racks/rails 54 such that they can be orthogonally deployed across the width of the improved trailer 1, as depicted in FIGS. 2C and 2D. Moreover, in even more variations, the vertical support struts cargo-carrying racks/rails 54 are either telescopically extendable to a variable height or their height can be supplemented by strut extension 56, as shown in FIG. 2D.

In many variations, the improved trailer's 1 tailgate member 52, has three operating positions, as depicted in FIGS. 2E, 2E-A, and 2E-B; FIGS. 2F and 2F-A; and FIGS. 2G and 2G-A; respectively. The function of the tail gate vertical travel hinge linkage 53, 55, 57, 59 is to provide a means for the tailgate's horizontal members 52 to lay flat against the trailer bed 2 when folded while also preventing the tailgate 52 hinges 53, 55, 57, 59 from obstructing the loading of cargo by lowering the hinge 53, 55, 57, 59 below the horizontal plane of the trailer bed 2.

FIGS. 2E-A and 2E-B depict an exploded view of an example tailgate 52 hinge that incorporates multiple nut-bolt assemblies 53, a sliding hinge base 55, and an anchor flange 57 that supports a tailgate strut 59. The slots in both the sliding hinge base 55 and the anchor flange 57 allow each of the nut/bolt assemblies 53 to slide in a fashion to raise and lower the tailgate 52 in conjunction with the pivoting hinge 53, 55, 57, 59.

In the first position (see FIG. 2E), the tailgate 52 is deployed fully upright to effectively close the cargo-containment area of the improved trailer 1. In the second position (see FIG. 2F), the tailgate 52 is deployed fully downward such that it is hanging below the rear of the trailer bed 2. This second tailgate 52 position is critical to provide an unobstructed rear-entry while loading vehicles or equipment by means of a ramp. Finally, in the third position (see FIG. 2G), the tailgate 52 is pivoted to lie flat inside the cargo-containment area against the trailer bed 2. The linkage of the tailgate 52 allows its hinged axis to be raised or lowered.

In another embodiment, the various cargo-containment sides/members 50, 58 and the tailgate 52 can be detachably coupled to facilitate full removal in order to allow the use of the improved trailer 1 as just a flatbed trailer.

In even more variations, referring to FIGS. 4C through 4E, the improved folding trailer 1 can be used as a flatbed cargo carrier with its cargo-containing sides/gates 50, 52, 58 disposed in a flat-folded configuration and with three additional struts 62 installed across folded sides 50 to convert the improved folding trailer bed's folded sides/gates into a flatbed cargo rack.

IV. An Improved Folding Trailer for Stowage

This Section IV is directed generally to an improved folding trailer that is designed to minimize its stowage footprint. Refer to FIGS. 1A through 1J, which are focused primarily on the improved folded-storage configuration; refer to FIGS. 2A through 2G-A, which are focused primarily on the improved trailer's 1 collapsible and configurable cargo-containment members (e.g., sides/walls, racks/rails, and tailgate); refer to FIGS. 3A-A through 3D-B, which are focused primarily on the improved swivel jack configuration; and refer to FIGS. 4A through 4E, which are focused on an alternate configuration of improved folding trailer's collapsible and configurable cargo-containment members and additional rail members to form flatbed cargo racks. For reference purposes, the end of the improved folding trailer 1 where the trailer tongue 4 is disposed is shall be considered the "front" of the trailer 1, and the opposite end as the "rear" of the trailer 1. Further, the end of the trailer tongue 4 that has the tongue coupler 34 shall be considered the "distal" end of the trailer tongue 4, and the opposite end of the trailer tongue 4 considered the "proximal" end.

In an embodiment, the improved folding trailer 1, comprises:
  a hinged trailer tongue 4 having a distal end and a proximal end, said hinge-portions 12 of said trailer tongue 4 being disposed on said proximal end and coupled to the bottom of the trailer's bed 2;
  a swivel-wheel trailer jack 6 attached to said distal end of said hinged trailer tongue 4, wherein said swivel-wheel trailer jack 6 is adapted to be able to be optionally positioned such that its swivel wheel 6 can longitudinally extend beyond said distal end of said trailer tongue 4;
  an integral locking bracket 14 and associated locking fastener 32, wherein when said trailer tongue 4 is in a fully extended position on the trailer 1, said locking bracket 14 and said trailer tongue 4 each having a hole with the same axis pierced laterally such that said locking fastener 32 is adapted to be able to be inserted through said coaxial holes in order to lock said trailer tongue 4 in the extended position;
  an integral winch 16, with an attached winch cable 18, mounted to the bottom surface of the trailer's bed 2, substantially laterally centered between the sides of the trailer bed 2, and longitudinally in front of the trailer wheels 10, wherein one end of said winch cable 18 is attached to a winch-cable anchor 20 attached to the underside of said trailer tongue 4, wherein said integral winch 16 is coupled to, or adapted to be coupled to, a rotational power source 28, 40; and
  two or more rear caster wheels 8 mounted on the rear of the trailer's bed 2, wherein: when said locking fastener 32 is removed from said locking bracket 14 and said integral winch 16 is actuated by a rotational power source 28, 40, the trailer will articulate upward at said hinge portions 12 of said trailer tongue 4, and when the trailer 1 is fully winched in to a jackknife configuration, the main load-carrying trailer wheels 10 are lifted off the floor or ground and said two or more rear caster wheels 8 and the swivel wheel on said swivel-wheel trailer jack 6 form at least three-points of contact with said floor or ground in order to facilitate the movement/repositioning of the completely folded trailer 1 when in its stowage configuration.

In some variations, the improved swivel jack 6 features a locking pin 6E adapted to be engaged in two aligned holes in predetermined locations in order to ensure that the effective length of the swivel jack 6 is such that the swivel jack wheel 6A and outer and inner telescoping tubes 6, 6F line up perpendicular to the ground when the improved folding trailer 1 is in its folded/stowed position to ensure optimum stability and to facilitate ease of travel for repositioning the improved trailer 1 in a storage setting. In some respects, the telescoping swivel jack 6 has common features known in the art, such as a gear box 6C and gear-box handle 6D for extending the telescoping tubes 6, 6F to raise/extend and lower/retract the swivel jack 6. In a typical variation, the locking pin 6E includes a bracket 6E-1, a compressible spring 6E-3, a spring pin 6E-5, a spring washer 6E-4, and a pin ring 6E-2.

In other variations, the improved trailer swivel jack's 6 locking-pin 6E assembly is used to fix the positions of the telescoping inner and outer jack tubes 6F, 6 relative to each other at a predetermined point. In FIG. 3C-A, the locking pin 6E is shown disengaged with the spring 6E-3 compressed as the pin 6E is butted against the outer jack-tube wall 6 and is not aligned to be inserted in the pre-fabricated hole in the inner jack tube 6F. In FIG. 3C-B, the locking pin 6E is shown fully engaged with the prefabricated hole in the inner jack tube 6F, with the locking-pin spring 6E-3 uncompressed. In FIG. 3C-C, the locking pin 6E is shown disengaged with the spring 6E-3 compressed and with the locking pin 6E rotated about 90 degrees so that the locking pin 6E will remain disengaged even if the locking pin 6E is aligned with the holes in the inner and outer jack tubes 6F, 6.

In other embodiments, as depicted in FIGS. 3D-A and 3D-B, the improved folding trailer 1 features a swivel jack 6 is in its front-extended position to facilitate trailer folding, wherein there is visual indictor on the improved swivel jack's outer and inner tubes 6, 6F to aid a user in determining is the jack is extended to the ideal position for trailer-folding operations in order to ensure optimum stability of the improved folded trailer 1 when it is in its completely folded configuration. In the case of FIG. 3D-A, the visual indicator is in the form of a line and/or scoring 6G on the inner swivel-jack tube 6F that is to be positioned, ideally, just below the lower edge of the outer swivel-jack tube 6. In the case of FIG. 3D-B, the visual indicator is in the form of two mating arrows 6H (or similar graphical indictors), one on the outer swivel-jack tube 6 and the other on the inner swivel-jack tube 6F.

In one alternative variation of the above embodiment, the trailer 1 either does not have an extended rearward profile beyond the wheels 10 such that the jack-knifing and stowage operations are possible without having to employ the aforementioned rear caster wheels 8 (that is, the rear caster wheels 8 are not included on the improved trailer 1) and instead relying only on the main trailer wheels 10 (most rearward, for trailers that might have multiple axles) to bear the weight of the trailer 1 with in a full, folded, stowage configuration. In another variation of this alternative scheme, the rear portion of the trailer bed 2 that extends past the most rearward main wheels 10 is configured to be slidably movable such that it can be slid inward over (or under) and towards the main body of the trailer 1, which in turn allows for the most rearward main wheels 10 to be used to bear the trailer's 1 weight when the trailer 1 is folded into its jackknife stowage configuration.

This embodiment can be enhanced wherein said integral winch 16 further comprises a worm-gear mechanism that prevents said winch cable from accidentally deploying and uncoiling.

This embodiment can be further enhanced wherein said integral winch 16 further comprises a coupled electric motor 40 to drive said winch 16. In variations, said electric motor 40 further comprises an onboard rechargeable battery 40 that can power said electric motor 40. In still more variations, said electric motor 40 and rechargeable battery 40 further comprise an onboard controller 40 that allows a user to operate said integral winch 16 and electric motor 40 with a wireless remote-control device 36. In other applications, said electric motor and/or rechargeable battery 40 can be powered by way of an external power cord or cable 60 connected to an external electric-power source.

This embodiment can be further enhanced wherein said integral winch 16 further comprises a drive-shaft coupler 24 fixedly and rotationally coupled 30 to said integral winch 16, said drive-shaft coupler 24 adapted to be detachably coupled to an external rotational power source 28. In variations, said integral winch 16 further comprises a flexible drive-shaft extension 26 for detachable coupling with an external rotational power source 28. In some applications, said external rotational power source 28 is selected from the group consisting of a hand-held electric drill and a hand crank.

This embodiment can be further enhanced wherein said integral winch 16 is further comprised of a gear ratio that turns the high-speed revolutions of said rotational power source 28, 40 into low speed/high torque power.

This embodiment can be further enhanced wherein the improved folding trailer 1 further comprises at least one folding-tongue stop 22 disposed behind said integral locking bracket 14 and on a side of the bottom of the trailer bed 2.

This embodiment can be further enhanced wherein the improved trailer 1 further comprises at least one cargo-containment member 50, 58 on each of the left and rights sides and proximal side of said trailer's bed 2, wherein each said cargo-containment member 50, 58 is adapted to be folded flat on top of said trailer bed 2 to facilitate trailer stowage and each said cargo-containment member 50, 58 can be placed and locked into an orthogonal position relative to the plane of said trailer bed 2 to facilitate cargo containment. In variations, each of said cargo-containment members 50, 58 is detachably coupled to said trailer bed 2. In even more variations, the improved trailer 1 further comprises a tailgate member 52, wherein said tailgate member 52 is adapted to be folded flat on top of said trailer bed 2 to facilitate trailer stowage; said tailgate member 52 can be placed and locked into an upright orthogonal position relative to the plane of said trailer bed 2 to facilitate cargo containment; and said tailgate member 52 can be placed into a downward orthogonal position relative to the plane of said trailer bed 2, leaving said tailgate member 52 hanging below the plane of said trailer bed 2. In other variations, said tailgate member 52 is detachably coupled to said trailer bed 2.

This embodiment can be further enhanced wherein the improved trailer 1 further comprises at least one cargo-carrying rack/rail 54 coupled to and disposed above each said left and right cargo-containment member 50, wherein each said cargo-carrying rack/rail 54 is coupled to at least one of said left or right cargo-containment members 50 via a vertical strut member 54. In variations, the spacing between said support struts 54 on each of said at least one cargo-carrying rack/rail 54 is dimensioned such that said at least one cargo-carrying rack/rail 54 can be installed onto said side cargo-containment members 50 either longitudinally parallel relative to the trailer's 1 length or orthogonally relative to the trailer's 1 length. In some applications, said vertical support strut member 54 can be height-adjustable. In other applications, additional vertical support strut members 56 are used to adjust the height of said cargo-carrying racks/rails 54.

This embodiment can be further enhanced wherein he improved folding trailer 1 can be used as a flatbed cargo carrier with its cargo-containing sides/gates 50, 52, 58 disposed in a flat-folded configuration and with three additional struts 62 installed across folded sides 50 to convert the improved folding trailer bed's folded sides/gates into a flatbed cargo rack.

V. A Method of Making an Improved Folding Trailer for Stowage

This Section V is directed generally to a method of making an improved folding trailer that is designed to minimize its stowage footprint and, in many embodiments, is comprised of a hinged trailer tongue and an integral winch that is adapted to use external power source that can be easily coupled and decoupled from the winch component. Refer to FIGS. 1A through 1J, which are focused primarily on the improved folded-storage configuration; refer to FIGS. 2A through 2G-A, which are focused primarily on the improved trailer's 1 collapsible and configurable cargo-containment members (e.g., sides/walls, racks/rails, and tailgate); refer to FIGS. 3A-A through 3D-B, which are focused primarily on the improved swivel jack configuration; and refer to FIGS. 4A through 4E, which are focused on an alternate configuration of improved folding trailer's collapsible and configurable cargo-containment members and additional rail members to form flatbed cargo racks. For reference purposes, the end of the improved folding trailer 1 where the trailer tongue 4 is disposed is shall be considered the "front" of the trailer 1, and the opposite end as the "rear" of the trailer 1. Further, the end of the trailer tongue 4 that has the tongue coupler 34 shall be considered the "distal" end of the trailer tongue 4, and the opposite end of the trailer tongue 4 considered the "proximal" end.

In an embodiment, the method comprises the steps of:

Providing a hinged trailer tongue 4 having a distal end and a proximal end, said hinge-portions 12 of said trailer tongue 4 being disposed on said proximal end and coupled to the bottom of the trailer's bed 2;

Providing a swivel-wheel trailer jack 6 attached to said distal end of said hinged trailer tongue 4, wherein said swivel-wheel trailer jack 6 is adapted to be able to be optionally positioned such that its swivel wheel 6 can longitudinally extend beyond said distal end of said trailer tongue 4;

Providing an integral locking bracket 14 and associated locking fastener 32, wherein when said trailer tongue 4 is in a fully extended position on the trailer 1, said locking bracket 14 and said trailer tongue 4 each having a hole with the same axis pierced laterally such that said locking fastener 32 is adapted to be able to be inserted through said coaxial holes in order to lock said trailer tongue 4 in the extended position;

Providing an integral winch 16, with an attached winch cable 18, mounted to the bottom surface of the trailer's bed 2, substantially laterally centered between the sides of the trailer bed 2, and longitudinally in front of the trailer wheels 10, wherein one end of said winch cable 18 is attached to a winch-cable anchor 20 attached to the underside of said trailer tongue 4, wherein said integral winch 16 is coupled to, or adapted to be coupled to, a rotational power source 28, 40; and Providing two or more rear caster wheels 8 mounted on the rear of the trailer's bed 2, wherein: when said locking fastener 32 is removed from said locking bracket 14 and said integral winch 16 is actuated by a rotational power source 28, 40, the trailer will articulate upward at said hinge portions 12 of said trailer tongue 4, and when the trailer 1 is fully winched in to a jackknife configuration, the main load-carrying trailer wheels 10 are lifted off the floor or ground and said two or more rear caster wheels 8 and the swivel wheel on said swivel-wheel trailer jack 6 form at least three-points of contact with said floor or ground in order to facilitate the movement/repositioning of the completely folded trailer 1 when in its stowage configuration.

This embodiment can be enhanced wherein the improved trailer swivel jack's 6 locking-pin 6E assembly is used to fix the positions of the telescoping inner and outer jack tubes 6F, 6 relative to each other at a predetermined point. In FIG. 3C-A, the locking pin 6E is shown disengaged with the spring 6E-3 compressed as the pin 6E is butted against the outer jack-tube wall 6 and is not aligned to be inserted in the pre-fabricated hole in the inner jack tube 6F. In FIG. 3C-B, the locking pin 6E is shown fully engaged with the prefabricated hole in the inner jack tube 6F, with the locking-pin spring 6E-3 uncompressed. In FIG. 3C-C, the locking pin 6E is shown disengaged with the spring 6E-3 compressed and with the locking pin 6E rotated about 90 degrees so that the locking pin 6E will remain disengaged even if the locking pin 6E is aligned with the holes in the inner and outer jack tubes 6F, 6.

This embodiment can be enhanced wherein the improved folding trailer 1 features a swivel jack 6 that can be placed in a front-extended position to facilitate trailer folding, wherein there is visual indictor on the improved swivel jack's outer and inner tubes 6, 6F to aid a user in determining is the jack is extended to the ideal position for trailer-folding operations in order to ensure optimum stability of the improved folded trailer 1 when it is in its completely folded configuration. In the case of FIG. 3D-A, the visual indicator is in the form of a line and/or scoring 6G on the inner swivel-jack tube 6F that is to be positioned, ideally, just below the lower edge of the outer swivel-jack tube 6. In the case of FIG. 3D-B, the visual indicator is in the form of two mating arrows 6H (or similar graphical indictors), one on the outer swivel-jack tube 6 and the other on the inner swivel-jack tube 6F.

This embodiment can be enhanced by further comprising the step of providing said integral winch 16 with a worm-gear mechanism that prevents said winch cable from accidentally deploying and uncoiling.

This embodiment can be enhanced by further comprising the step of providing said integral winch 16 with a coupled electric motor 40 to drive said winch 16. In variations, the method further comprises the step of providing said electric motor 40 with an onboard rechargeable battery 40 that can power said electric motor 40. In still more variations, the method further comprises the step of providing said electric motor 40 and rechargeable battery 40 with an onboard controller 40 that allows a user to operate said integral winch 16 and electric motor 40 with a wireless remote-control device 36. In other applications, said electric motor and/or rechargeable battery 40 can be powered by way of an external power cord or cable 60 connected to an external electric-power source.

This embodiment can be enhanced by further comprising the step of providing said integral winch 16 with a drive-shaft coupler 24 fixedly and rotationally coupled 30 to said integral winch 16, said drive-shaft coupler 24 adapted to be detachably coupled to an external rotational power source 28. In variations, the method further comprises the step of providing said integral winch 16 with a flexible drive-shaft extension 26 for detachable coupling with an external rotational power source 28. In some applications, said external rotational power source 28 is selected from the group consisting of a hand-held electric drill and a hand crank.

This embodiment can be further enhanced wherein said integral winch 16 has a gear ratio that turns the high-speed revolutions of said rotational power source 28, 40 into low speed/high torque power.

This embodiment can be enhanced by further comprising the step of providing the improved folding trailer 1 further with at least one folding-tongue stop 22 disposed behind said integral locking bracket 14 and on a side of the bottom of the trailer bed 2.

This embodiment can be enhanced by further comprising the step of providing the improved trailer 1 with at least one cargo-containment member 50, 58 on each of the left and rights sides and proximal side of said trailer's bed 2, wherein each said cargo-containment member 50, 58 is adapted to be folded flat on top of said trailer bed 2 to facilitate trailer stowage and each said cargo-containment member 50, 58 can be placed and locked into an orthogonal position relative to the plane of said trailer bed 2 to facilitate cargo containment. In variations, each of said cargo-containment members 50, 58 is detachably coupled to said trailer bed 2. In even more variations, the method further comprises the step of providing said improved trailer 1 with a tailgate member 52, wherein said tailgate member 52 is adapted to be folded flat on top of said trailer bed 2 to facilitate trailer stowage; said tailgate member 52 can be placed and locked into an upright orthogonal position relative to the plane of said trailer bed 2 to facilitate cargo containment; and said tailgate member 52 can be placed into a downward orthogonal position relative to the plane of said trailer bed 2, leaving said tailgate member 52 hanging below the plane of said trailer bed 2. In other variations, said tailgate member 52 is detachably coupled to said trailer bed 2.

This embodiment can be enhanced by further comprising the step of providing the improved trailer 1 with at least one cargo-carrying rack/rail 54 coupled to and disposed above each said left and right cargo-containment member 50, wherein each said cargo-carrying rack/rail 54 is coupled to at least one of said left or right cargo-containment members 50 via a vertical strut member 54. In variations, the spacing between said support struts 54 on each of said at least one cargo-carrying rack/rail 54 is dimensioned such that said at least one cargo-carrying rack/rail 54 can be installed onto said side cargo-containment members 50 either longitudinally parallel relative to the trailer's 1 length or orthogonally relative to the trailer's 1 length. In some applications, said vertical support strut member 54 can be height-adjustable. In other applications, the method further comprises the step of providing additional vertical support strut members 56 that can be used to adjust the height of said cargo-carrying racks/rails 54.

This embodiment can be further enhanced wherein he improved folding trailer 1 can be used as a flatbed cargo carrier with its cargo-containing sides/gates 50, 52, 58 disposed in a flat-folded configuration and with three additional struts 62 installed across folded sides 50 to convert the improved folding trailer bed's folded sides/gates into a flatbed cargo rack.

VI. A Method of Using an Improved Folding Trailer for Stowage

This Section VI is directed generally to a method of using an improved folding trailer that is designed to minimize its stowage footprint and, in many embodiments, is comprised of a hinged trailer tongue and an integral winch that is adapted to use external power source that can be easily coupled and decoupled from the winch component. Refer to FIGS. 1A through 1J, which are focused primarily on the improved folded-storage configuration; refer to FIGS. 2A through 2G-A, which are focused primarily on the improved trailer's 1 collapsible and configurable cargo-containment members (e.g., sides/walls, racks/rails, and tailgate); refer to FIGS. 3A-A through 3D-B, which are focused primarily on the improved swivel jack configuration; and refer to FIGS. 4A through 4E, which are focused on an alternate configuration of improved folding trailer's collapsible and configurable cargo-containment members and additional rail members to form flatbed cargo racks. For reference purposes, the end of the improved folding trailer 1 where the trailer tongue 4 is disposed is shall be considered the "front" of the trailer 1, and the opposite end as the "rear" of the trailer 1. Further, the end of the trailer tongue 4 that has the tongue coupler 34 shall be considered the "distal" end of the trailer tongue 4, and the opposite end of the trailer tongue 4 considered the "proximal" end.

In an embodiment, the method comprises the steps of:
Obtaining an improved folding trailer 1 according to Section III or IV, supra, said folding trailer 1 in its fully unfolded configuration;
Placing said swivel-wheel trailer jack 6 in its downward position;
Engaging said swivel-wheel trailer jack 6 wheel brake 6B;
Disengaging the tongue coupler 34 of said improved folding trailer 1 from its tow vehicle, if applicable, and raising the front of said improved folding trailer 1 with the telescoping feature of said swivel-wheel trailer jack 6;
Repositioning said swivel-wheel trailer jack 6 to longitudinally extend beyond said distal end of said trailer tongue 4, wherein the end wheel of said swivel-wheel trailer jack 6 is in direct contact with the floor or ground;
Removing said locking fastener 32 from said integral locking bracket 14;
Ensuring that a rotational power source 28, 40 is coupled to said integral winch 16;
Operating said rotational power source 28, 40 and integral winch 16 to cause said improved folding trailer 1 to raise at said hinged portion 12 of said trailer tongue 4 until said two or more rear caster wheels 8 make contact with said floor or ground, said main load-carrying trailer wheels 10 are lifted off the floor or ground, and said improved trailer 1 is in a jackknife configuration for stowage;
Disengaging said swivel-wheel trailer jack 6 wheel brake 6B; and
Rolling said improved folding trailer 1 while it is in its jackknifed configuration to a user-determined place of stowage.

In other variations, the improved trailer swivel jack's 6 locking-pin 6E assembly is used to fix the positions of the telescoping inner and outer jack tubes 6F, 6 relative to each other at a predetermined point. In FIG. 3C-A, the locking pin 6E is shown disengaged with the spring 6E-3 compressed as the pin 6E is butted against the outer jack-tube wall 6 and is not aligned to be inserted in the pre-fabricated hole in the inner jack tube 6F. In FIG. 3C-B, the locking pin 6E is shown fully engaged with the prefabricated hole in the inner jack tube 6F, with the locking-pin spring 6E-3 uncompressed. In FIG. 3C-C, the locking pin 6E is shown disengaged with the spring 6E-3 compressed and with the locking pin 6E rotated about 90 degrees so that the locking pin 6E will remain disengaged even if the locking pin 6E is aligned with the holes in the inner and outer jack tubes 6F, 6.

In other embodiments, as depicted in FIGS. 3D-A and 3D-B, the improved folding trailer 1 features a swivel jack 6 that can be placed in a front-extended position to facilitate trailer folding, wherein there is visual indictor on the improved swivel jack's outer and inner tubes 6, 6F to aid a user in determining is the jack is extended to the ideal position for trailer-folding operations in order to ensure optimum stability of the improved folded trailer 1 when it is in its completely folded configuration. In the case of FIG. 3D-A, the visual indicator is in the form of a line and/or scoring 6G on the inner swivel-jack tube 6F that is to be positioned, ideally, just below the lower edge of the outer swivel-jack tube 6. In the case of FIG. 3D-B, the visual indicator is in the form of two mating arrows 6H (or similar graphical indictors), one on the outer swivel-jack tube 6 and the other on the inner swivel-jack tube 6F.

This embodiment can be enhanced wherein said integral winch 16 further comprises a worm-gear mechanism that prevents said winch cable from accidentally deploying and uncoiling.

This embodiment can be further enhanced wherein said integral winch 16 further comprises a coupled electric motor 40 to drive said winch 16. In variations, said electric motor 40 further comprises an onboard rechargeable battery 40 that can power said electric motor 40. In still more variations, said electric motor 40 and rechargeable battery 40 further comprise an onboard controller 40 that allows a user to operate said integral winch 16 and electric motor 40 with a wireless remote-control device 36. In other applications, said electric motor and/or rechargeable battery 40 can be powered by way of an external power cord or cable 60 connected to an external electric-power source.

This embodiment can be further enhanced wherein said integral winch 16 further comprises a drive-shaft coupler 24 fixedly and rotationally coupled 30 to said integral winch 16, said drive-shaft coupler 24 adapted to be detachably coupled to an external rotational power source 28. In variations, said integral winch 16 further comprises a flexible drive-shaft extension 26 for detachable coupling with an external rotational power source 28. In some applications, said external rotational power source 28 is selected from the group consisting of a hand-held electric drill and a hand crank. Accordingly, the method can be enhanced by further comprising the step of detachably connecting an external rotational power source 28 to said flexible drive-shaft extension 26.

This embodiment can be further enhanced wherein said integral winch 16 is further comprised of a gear ratio that turns the high-speed revolutions of said rotational power source 28, 40 into low speed/high torque power.

This embodiment can be further enhanced wherein the improved folding trailer 1 further comprises at least one folding-tongue stop 22 disposed behind said integral locking bracket 14 and on a side of the bottom of the trailer bed 2.

This embodiment can be further enhanced wherein the improved trailer 1 further comprises at least one cargo-containment member 50, 58 on each of the left and rights sides and proximal side of said trailer's bed 2, wherein each said cargo-containment member 50, 58 is adapted to be folded flat on top of said trailer bed 2 to facilitate trailer stowage and each said cargo-containment member 50, 58 can be placed and locked into an orthogonal position relative to the plane of said trailer bed 2 to facilitate cargo containment. In variations, each of said cargo-containment members 50, 58 is detachably coupled to said trailer bed 2. In even more variations, the improved trailer 1 further comprises a tailgate member 52, wherein said tailgate member 52 is adapted to be folded flat on top of said trailer bed 2 to facilitate trailer stowage; said tailgate member 52 can be placed and locked into an upright orthogonal position relative to the plane of said trailer bed 2 to facilitate cargo containment; and said tailgate member 52 can be placed into a downward orthogonal position relative to the plane of said trailer bed 2, leaving said tailgate member 52 hanging below the plane of said trailer bed 2. In other variations, said tailgate member 52 is detachably coupled to said trailer bed 2.

This embodiment can be further enhanced wherein the improved trailer 1 further comprises at least one cargo-carrying rack/rail 54 coupled to and disposed above each said left and right cargo-containment member 50, wherein each said cargo-carrying rack/rail 54 is coupled to at least one of said left or right cargo-containment members 50 via a vertical strut member 54. In variations, the spacing between said support struts 54 on each of said at least one cargo-carrying rack/rail 54 is dimensioned such that said at least one cargo-carrying rack/rail 54 can be installed onto said side cargo-containment members 50 either longitudinally parallel relative to the trailer's 1 length or orthogonally relative to the trailer's 1 length. In some applications, said vertical support strut member 54 can be height-adjustable. In other applications, additional vertical support strut members 56 are used to adjust the height of said cargo-carrying racks/rails 54.

This embodiment can be further enhanced wherein he improved folding trailer 1 can be used as a flatbed cargo carrier with its cargo-containing sides/gates 50, 52, 58 disposed in a flat-folded configuration and with three additional struts 62 installed across folded sides 50 to convert the improved folding trailer bed's folded sides/gates into a flatbed cargo rack.

VII. Alternative Embodiments and Other Variations

The various embodiments and variations thereof described herein, including the descriptions in any appended claims and/or illustrated in the accompanying Figures, are merely exemplary and are not meant to limit the scope of the inventive disclosure. It should be appreciated that numerous variations of the invention have been contemplated as would be obvious to one of ordinary skill in the art with the benefit of this disclosure.

Hence, those ordinarily skilled in the art will have no difficulty devising myriad obvious variations and improvements to the invention, all of which are intended to be encompassed within the scope of the Description, Claims, and Figures herein.

What is claimed is:

1. An improved folding trailer, said trailer having a bed and at least one pair of load-bearing wheels, comprising:
   a hinged trailer tongue having a distal end and a proximal end, with hinge-portions of said trailer tongue being disposed on said proximal end and coupled to the bottom of said trailer's bed;
   a swivel-wheel trailer jack attached to said distal end of said hinged trailer tongue, wherein:
      said swivel-wheel trailer jack includes telescoping inner and outer jack tubes to facilitate extending the jack,
      said swivel-wheel trailer jack is adapted to be able to be optionally positioned such that its swivel wheel can longitudinally extend beyond said distal end of said trailer tongue, and
      said swivel-wheel jack includes a manually operated wheel brake to minimize unwanted travel of said hinged trailer tongue during trailer-folding operations;
   an integral locking bracket and associated locking fastener, wherein when said trailer tongue is in a fully extended position on the trailer, said locking bracket and said trailer tongue each having a hole with the same axis pierced laterally such that said locking fastener is adapted to be able to be inserted through said coaxial holes in order to lock said trailer tongue in the extended position;
   at least one folding-tongue stop disposed behind said integral locking bracket and on a side of the bottom of said trailer bed;
   an integral winch, with an attached winch cable, mounted to the bottom surface of the trailer's bed, substantially laterally centered between the sides of said trailer bed, and longitudinally in front of said load-bearing trailer wheels, wherein one end of said winch cable is attached to a winch-cable anchor attached to the underside of said trailer tongue,
      wherein said integral winch is coupled to, or adapted to be coupled to, a rotational power source; and two or more rear caster wheels mounted on the rear of said trailer's bed, wherein:
when said locking fastener is removed from said locking bracket and said integral winch is actuated by a rotational power source, the trailer will articulate upward at said hinge portions of said trailer tongue, and
when the trailer is fully winched in to a jackknife configuration, said load-bearing wheels are lifted off the floor or ground and said two or more rear caster wheels and the swivel wheel on said swivel-wheel trailer jack form at least three-points of contact with said floor or ground in order to facilitate the movement/repositioning of the completely folded trailer when in its stowage configuration.

2. The improved folding trailer of claim 1, wherein:
said swivel-wheel trailer jack incorporates a locking-pin assembly for fixing the positions of said telescoping inner and outer jack tubes relative to each other at a predetermined point;
said locking-pin assembly is comprised of a pin, an engagement spring, and a pin ring, and is positioned to be able to engage prefabricated holes in said telescoping inner and outer jack tubes in order to lock the telescoping position of said swivel-wheel trailer jack,
said locking pin can be disengaged with said engagement spring compressed as said locking pin is butted against said outer jack-tube wall when said locking pin is not aligned to be inserted in the pre-fabricated hole in said inner jack tube,
said locking pin can be fully engaged with said prefabricated hole in said inner jack tube with the locking-pin spring uncompressed, and
said locking pin can be fixedly prevented from engaging with said prefabricated hole in said inner jack tube with said engagement spring compressed and with said locking pin rotated about 90 degrees so that said locking pin will remains disengaged even if said locking pin is aligned with the holes in said inner jack tube.

3. The improved folding trailer of claim 1, wherein:
said swivel-wheel trailer jack incorporates a visual indicator on said swivel jack's outer and inner tubes to aid a user in determining is the jack is extended to the ideal position for trailer-folding operations in order to ensure optimum stability of the improved folded trailer when in its completely folded configuration; and
said the visual indicator is in a form selected from the group consisting of:
a line/scoring on said inner jack tube that is intended to be positioned just below the lower edge of said outer jack tube, and
at least two mating arrows (or similar graphical indictors), one disposed on said outer jack tube and the other disposed on said inner jack tube.

4. The improved folding trailer of claim 1, wherein said integral winch further comprises a worm-gear mechanism that prevents said winch cable from accidentally deploying and uncoiling.

5. The improved folding trailer of claim 1, wherein said integral winch further comprises a coupled electric motor to drive said winch and an onboard rechargeable battery that can power said electric motor.

6. The improved folding trailer of claim 5, wherein said electric motor and rechargeable battery further comprise an onboard controller that allows a user to operate said integral winch and electric motor with a wireless remote-control device.

7. The improved folding trailer of claim 5, wherein power to said electric motor and rechargeable battery can be powered by way of an external power cord or cable connected to an external electric-power source.

8. The improved folding trailer of claim 1, wherein said integral winch further comprises a drive-shaft coupler fixedly and rotationally coupled to said integral winch, said drive-shaft coupler adapted to be detachably coupled to an external rotational power source.

9. The improved folding trailer of claim 8, wherein said integral winch further comprises a flexible drive-shaft extension for detachable coupling with an external rotational power source.

10. The improved folding trailer of claim 9, wherein said external rotational power source is selected from the group consisting of a hand-held electric drill and a hand crank.

11. The improved folding trailer of claim 1, wherein said integral winch is further comprised of a gear ratio that turns the revolutions of said rotational power source into lower-speed and higher-torque power.

12. The improved folding trailer of claim 1, further comprising at least one cargo-containment member on each of the left and rights sides and proximal side of said trailer's bed, wherein:
each said cargo-containment member is adapted to be folded flat on top of said trailer bed to facilitate trailer stowage; and
each said cargo-containment member can be placed and locked into an orthogonal position relative to the plane of said trailer bed to facilitate cargo containment.

13. The improved folding trailer of claim 12, wherein each of said cargo-containment members is detachably coupled to said trailer bed.

14. The improved folding trailer of claim 12, further comprising a tailgate member, wherein:
said tailgate member is adapted to be folded flat on top of said trailer bed to facilitate trailer stowage;
said tailgate member can be placed and locked into an upright orthogonal position relative to the plane of said trailer bed to facilitate cargo containment; and
said tailgate member can be placed into a downward orthogonal position relative to the plane of said trailer bed, leaving said tailgate member hanging below the plane of said trailer bed.

15. The improved folding trailer of claim 14, wherein said tailgate member is detachably coupled to said trailer bed.

16. The improved folding trailer of claim 12, further comprising at least one cargo-carrying rack or rail coupled to and disposed above each said left and right cargo-containment member, wherein each said cargo-carrying rack or rail is coupled to at least one of said left or right cargo-containment members via a vertical strut member.

17. The improved folding trailer of claim 16, wherein the spacing between said support struts on each of said at least one cargo-carrying rack or rail is dimensioned such that said at least one cargo-carrying rack or rail can be installed onto said side cargo-containment members either longitudinally parallel relative to the trailer's length or orthogonally relative to the trailer's length.

18. The improved folding trailer of claim 16, wherein each said vertical support strut member can be height-adjustable.

19. The improved folding trailer of claim 16, wherein additional vertical support strut members are used to adjust the height of said cargo-carrying racks or rails.

20. The improved folding trailer of claim 12, further comprising two or more removable struts adapted to be connected between said at least one cargo-containment member on each of the left and rights sides of said trailer's bed, when said left and right sides are folded flat on top of said trailer bed in order to form a cargo rack on said trailer bed.

* * * * *